(12) United States Patent
Sawada et al.

(10) Patent No.: US 12,056,224 B2
(45) Date of Patent: Aug. 6, 2024

(54) INFORMATION PROCESSING APPARATUS, INFORMATION PROCESSING METHOD, AND STORAGE MEDIUM

(71) Applicant: NEC Corporation, Tokyo (JP)

(72) Inventors: Megumi Sawada, Tokyo (JP); Yasuhito Wakana, Tokyo (JP); Chiho Tomizawa, Tokyo (JP); Mika Otsubo, Tokyo (JP); Tobiyasu Ichikawa, Tokyo (JP)

(73) Assignee: NEC CORPORATION, Tokyo (JP)

( * ) Notice: Subject to any disclaimer, the term of this patent is extended or adjusted under 35 U.S.C. 154(b) by 297 days.

(21) Appl. No.: 17/618,566

(22) PCT Filed: Jun. 11, 2020

(86) PCT No.: PCT/JP2020/023008
§ 371 (c)(1),
(2) Date: Dec. 13, 2021

(87) PCT Pub. No.: WO2020/262018
PCT Pub. Date: Dec. 30, 2020

(65) Prior Publication Data
US 2022/0245226 A1 Aug. 4, 2022

(30) Foreign Application Priority Data
Jun. 26, 2019 (JP) .................. 2019-118356

(51) Int. Cl.
*G06F 21/32* (2013.01)
*G06F 9/455* (2018.01)
*G06F 21/12* (2013.01)

(52) U.S. Cl.
CPC .......... *G06F 21/32* (2013.01); *G06F 9/45558* (2013.01); *G06F 21/121* (2013.01);
(Continued)

(58) Field of Classification Search
CPC .............. G06F 9/45558; G06F 21/121; G06F 2009/45575; G06F 2009/45587
(Continued)

(56) References Cited

U.S. PATENT DOCUMENTS

| 2013/0283273 | A1  | 10/2013 | Miyazaki |
| 2015/0089376 | A1* | 3/2015  | Slapp, III ................. G09B 7/00 715/738 |
| 2018/0129523 | A1  | 5/2018  | Bryant et al. |

FOREIGN PATENT DOCUMENTS

| CN | 108281052 A | 7/2018 |
| EP | 3299960 A1  | 3/2018 |

(Continued)

OTHER PUBLICATIONS

Extended European Search Report for EP Application No. 20833067.0, dated on Aug. 16, 2022.
(Continued)

*Primary Examiner* — Lan Dai T Truong
(74) *Attorney, Agent, or Firm* — Sughrue Mion, PLLC

(57) ABSTRACT

An information processing apparatus according to the present invention includes: a reception unit that receives usage reservation of a virtual machine for each usage time zone; a control unit that permits reception of the usage reservation until the number of the usage reservations in the usage time zone reaches a predetermined total number of the virtual machines that can operate simultaneously; and an assignment unit that assigns the usage reservation to any one of the virtual machines with respect to the usage time zone and enables a user to use the virtual machine.

10 Claims, 35 Drawing Sheets

(52) U.S. Cl.
CPC ............. *G06F 2009/45575* (2013.01); *G06F 2009/45587* (2013.01); *G06F 2009/45595* (2013.01)

(58) Field of Classification Search
USPC .......................................................... 726/17
See application file for complete search history.

(56) References Cited

FOREIGN PATENT DOCUMENTS

| | | |
|---|---|---|
| JP | 2006-091954 A | 4/2006 |
| JP | 2013-020440 A | 1/2013 |
| JP | 2017-073062 A | 4/2017 |
| JP | 2018-077846 A | 5/2018 |
| WO | 2012/093472 A | 7/2012 |

OTHER PUBLICATIONS

International Search Report for PCT Application No. PCT/JP2020/023008, mailed on Sep. 1, 2020.

\* cited by examiner

| No | ITEM NAME |
|---|---|
| 1 | USER ID |
| 2 | NAME |
| 3 | USER CLASSIFICATION |
| 4 | STUDENT NUMBER |
| 5 | STUDY CODE |
| 6 | REGISTERED FACE IMAGE |
| 7 | ADDRESS |
| 8 | CONTACTS |
| 9 | LOGIN PASSWORD |

| No | ITEM NAME |
|---|---|
| 1 | PC ENVIRONMENT ID |
| 2 | PC ENVIRONMENT NAME |
| 3 | APPLICATION ID |
| 4 | VIRTUAL MACHINE ID |

| No | ITEM NAME |
|----|-----------|
| 1 | PC ENVIRONMENT ID |
| 2 | DATE |
| 3 | SLOT NO |
| 4 | UPPER LIMIT NUMBER |
| 5 | REMAINING NUMBER |

| No | ITEM NAME |
|---|---|
| 1 | RESERVATION ID |
| 2 | USER ID |
| 3 | PC ENVIRONMENT ID |
| 4 | RESERVATION DATE |
| 5 | RESERVATION START TIME |
| 6 | RESERVATION END TIME |
| 7 | START SLOT NO |
| 8 | END SLOT NO |
| 9 | RESERVATION STATUS |
| 10 | REGISTRANT CLASSIFICATION |
| 11 | MACHINE ASSIGNED TO RESERVATION |

| No | ITEM NAME |
|---|---|
| 1 | VIRTUAL MACHINE ID |
| 2 | PC ENVIRONMENT ID |
| 3 | DATE |
| 4 | SLOT NO |
| 5 | RESERVATION ID |
| 6 | USER ID |

FIG. 11

PC ENVIRONMENT LIST SCREEN

USER ID: aaa AAA USER NAME: ○△□ [CONFIRMATION OF RESERVATION]

Select the PC environment you want to use.

| PC ENVIRONMENT ID | OS | AVAILABLE APPLICATIONS | |
|---|---|---|---|
| Env_001 | OS_001 | App-VR, App-W, App-P, ··· | SELECT |
| Env_002 | OS_002 | App-CAD, App-W, App-E, ··· | SELECT |
| Env_003 | OS_003 | App-DR, App-A, App-B, ··· | SELECT |
| Env_004 | OS_003 | App-A, App-B, App-C, ··· | SELECT |
| Env_005 | OS_004 | App-D, App-E, App-F, ··· | SELECT |

[LOGOUT]

FIG. 12

RESERVATION SCREEN

USER ID: aaa AAA    USER NAME: ○△□    CONFIRMATION OF RESERVATION

PC ENVIRONMENT ID: Env_001
AVAILABLE APPLICATIONS: App-VR, App-W, App-P, App-E, ···

DATE: 2019/06/03

AVAILABILITY:

| 13:00 | 14:00 | 15:00 | 16:00 | 16:00 | 17:00 | 18:00 | 19:00 |

B    A

START TIME: 13 : 30
END TIME:   17 : 00

RESERVE    RETURN

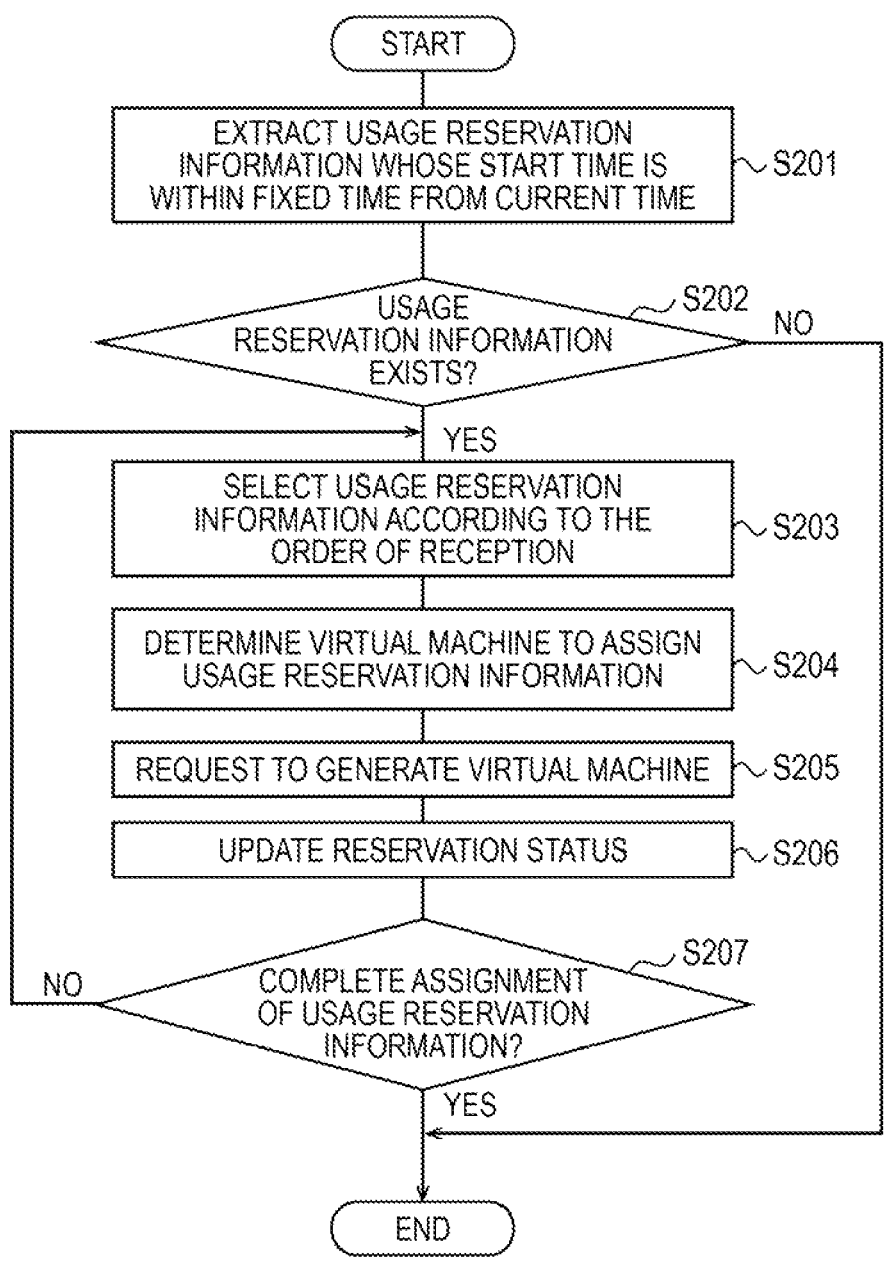

FIG. 17

| ADMINISTRATOR SCREEN | | LOGOUT |

USER ID: bbb BBB   USER NAME: ***

MENU
- > CONFIRMATION OF PERSONAL RESERVATION STATUS
- ☐ ADMINISTRATOR RESERVATION
  - > CSV BATCH PROCESSING
  - > PROCESSING STATUS LIST
- ☐ ADMINISTRATOR ACCOUNT
- > SETTINGS

CSV BATCH PROCESSING

☐ UPLOAD

| FILE NAME | 20190402.csv | FILE SELECTION |

UPLOAD

☐ DOWNLOAD

CLASS ID

PERIOD  ～

DOWNLOAD

| No | ITEM NAME |
|---|---|
| 1 | RESERVATION ID |
| 2 | USER ID |
| 3 | PC ENVIRONMENT ID |
| 4 | DATE OF USE |
| 5 | START TIME OF USE |
| 6 | END TIME OF USE |

FIG. 28

PROPOSAL SCREEN

<DETAILS OF RESERVATION>
    PC ENVIRONMENT ID  : Env_010
    AVAILABLE APPLICATIONS : App-X
    RESERVATION TIME  : 2019.06.05 18:00 - 20:00

Mr./Ms. X tends to come later than the reservation time. Would you like to delay the start time by 15 minutes?

Delay your reservation time by 15 minutes, please press the Change of reservation button.
If you do not change the reservation time, please press the Register button.

| No | USAGE RESERVATION | USAGE RESULTS |
|---|---|---|
| 1 | 2019.06.01 18:00 - 20:00 | 2019.06.01 19:17 - 20:00 |
| 2 | 2019.05.30 18:00 - 20:00 | 2019.05.30 18:40 - 20:00 |
| 3 | 2019.05.28 18:00 - 20:00 | 2019.05.28 18:35 - 19:49 |
| 4 | 2019.05.27 18:00 - 20:00 | 2019.05.27 18:45 - 20:37 |
| 5 | 2019.05.26 18:00 - 20:00 | 2019.05.26 18:20 - 19:30 |

[CHANGE OF RESERVATION] [REGISTER]

INFORMATION PROCESSING APPARATUS, INFORMATION PROCESSING METHOD, AND STORAGE MEDIUM

This application is a National Stage Entry of PCT/JP2020/023008 filed on Jun. 11, 2020, which claims priority from Japanese Patent Application 2019-118356 filed on Jun. 26, 2019, the contents of all of which are incorporated herein by reference, in their entirety.

TECHNICAL FIELD

The present invention relates to an information processing apparatus, an information processing method, and a storage medium.

BACKGROUND ART

Patent Literature 1 discloses a license management system for managing reservation information of a plurality of virtual machines in which licensed software is previously installed. When the system receives the reservation information transmitted from the client terminal, the system determines whether or not the reservation information can be registered according to the registration status of the reservation information at the present time.

CITATION LIST

Patent Literature

PTL1: Japanese Patent Application Laid-Open No. 2013-20440

SUMMARY OF INVENTION

Technical Problem

In the system described in the Patent Literature 1, a user needs to designate and reserve a virtual machine in which desired software is installed from among a plurality of virtual machines. However, if the user specifies the virtual machine to be used at the reservation stage, there is a possibility that the limited number of virtual machines cannot be efficiently used even if there are other vacant virtual machines.

In view of the above problems, an object of the present invention is to provide an information processing apparatus, an information processing method, and a storage medium capable of efficiently using a virtual machine.

Solution to Problem

According to one aspect of the present invention, there is provided an information processing apparatus including: a reception unit that receives usage reservation of a virtual machine for each usage time zone; a control unit that permits reception of the usage reservation until the number of the usage reservations in the usage time zone reaches a predetermined total number of the virtual machines that can operate simultaneously; and an assignment unit that assigns the usage reservation to any one of the virtual machines with respect to the usage time zone and enables a user to use the virtual machine.

According to another aspect of the present invention, there is provided an information processing method including: receiving a usage reservation of a virtual machine for each usage time zone; permitting reception of the usage reservation until the number of the usage reservations in the usage time zone reaches a predetermined total number of the virtual machines that can operate simultaneously; and assigning the usage reservation to any one of the virtual machines with respect to the usage time zone and enables a user to use the virtual machine.

According to yet another example aspect of the present invention, there is provided a storage medium storing a program that causes a computer to perform: receiving a usage reservation of a virtual machine for each usage time zone; permitting reception of the usage reservation until the number of the usage reservations in the usage time zone reaches a predetermined total number of the virtual machines that can operate simultaneously; and assigning the usage reservation to any one of the virtual machines with respect to the usage time zone and enables a user to use the virtual machine.

Advantageous Effects of Invention

According to the present invention, it is possible to provide an information processing apparatus, an information processing method, and a storage medium that can efficiently use a virtual machine.

BRIEF DESCRIPTION OF DRAWINGS

FIG. 3 is a diagram illustrating an example of information stored in a user information table according to the first example embodiment.

FIG. 4 is a diagram illustrating an example of information stored in a PC environment management table according to the first example embodiment.

FIG. 5 is a diagram illustrating an example of information stored in an upper limit number setting table according to the first example embodiment.

FIG. 6 is a diagram illustrating an example of information stored in a usage reservation information table according to the first example embodiment.

FIG. 7 is a diagram illustrating an example of information stored in an assignment information table according to the first example embodiment.

FIG. 11 is a diagram illustrating an example of a PC environment list screen displayed on the user terminal according to the first example embodiment.

FIG. 12 is a diagram illustrating an example of a reservation screen displayed on the user terminal according to the first example embodiment.

FIG. 14 is a flowchart illustrating an example of assignment processing of usage reservation information according to the first example embodiment.

FIG. 17 is a diagram illustrating an example of an administrator screen displayed on the user terminal according to the first example embodiment.

FIG. 25 is a diagram illustrating an example of information stored in a usage results information table according to the third example embodiment.

FIG. 28 is a diagram illustrating an example of a proposal screen displayed on the user terminal according to the third example embodiment.

DESCRIPTION OF EMBODIMENTS

Exemplary example embodiments of the disclosure will be described below with reference to the drawings. Throughout the drawings, similar features or corresponding features are labeled with the same references, and the description thereof may be omitted or simplified.

First Example Embodiment

Figure 1:
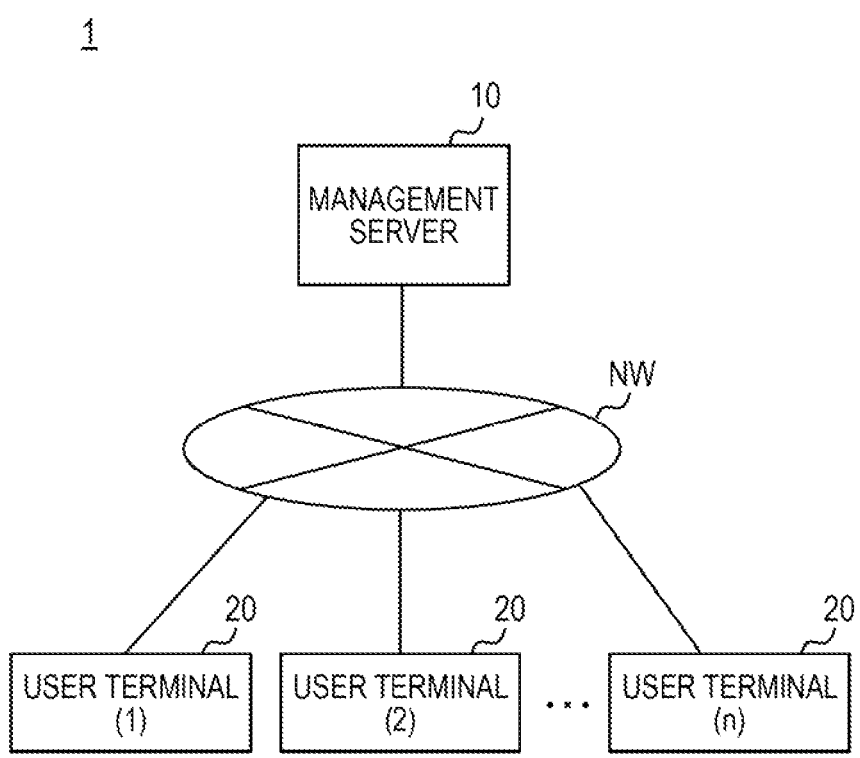
FIG. 1 is a block diagram illustrating an example of the overall configuration of an information processing system according to a first example embodiment.

FIG. 1 is a block diagram illustrating an example of the overall configuration of an information processing system 1 according to a first example embodiment. As illustrated in FIG. 1, in the information processing system 1, a management server 10 and n (n is a natural number) numbers of user terminals 20 are connected via a network NW such as the Internet or a Local Area Network (LAN). The information processing system 1 according to the present example embodiment is a computer system for providing a virtual desktop environment (hereinafter also referred to as "virtual machine") to a user such as a student or an employee in a university facility. However, the application of the present invention is not limited to educational facilities such as universities. The present invention can be applied, for example, to any facility such as a company or a government office.

The management server 10 is a server computer disposed in the university facility or in a data center affiliated with the university. The user terminal 20 is a terminal device used by the user when the user reserves and uses the virtual desktop environment (virtual machine). Examples of the user terminal 20 include such as a personal computer, a tablet terminal, and a smartphone. In the Virtual Desktop Infrastructure (VDI) system according to the present example embodiment, any user terminal 20 including input means, display means, and communication means can be used.

Figure 2:
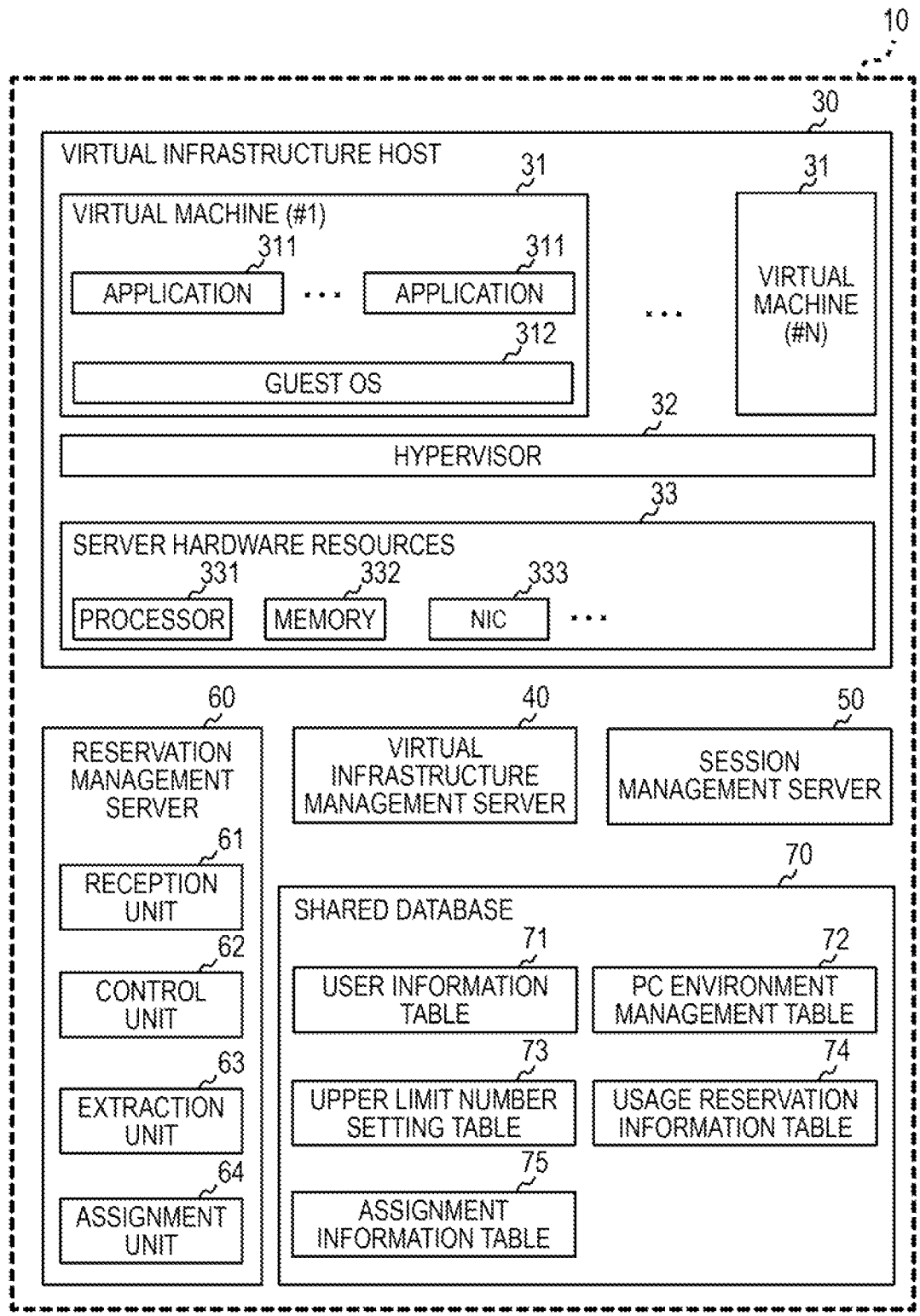
FIG. 2 is a block diagram illustrating an example of the overall configuration of a management server according to the first example embodiment.

FIG. 2 is a block diagram illustrating an example of the overall configuration of the management server 10 according to the first example embodiment. In FIG. 2, the management server 10 is illustrated as a server group including a virtual infrastructure host 30, a virtual infrastructure management server 40, a session management server 50, a reservation management server 60, and a shared database 70. The management server 10 may further include servers other than the plurality of servers illustrated in FIG. 2. Further, the management server 10 may be configured as one server in which a plurality of servers is integrated.

The virtual infrastructure host 30 is a server computer serving as a base for operating a virtual desktop. The virtual infrastructure host 30 includes N (N is a natural number) numbers of virtual machines 31, a hypervisor 32, and server hardware resources 33. Each of the virtual machines 31 is a virtual computer including a plurality of applications 311 and a guest OS 312. The hypervisor 32 is control software that virtualizes the computer and allows the virtual machine 31 to run on one physical server (virtual infrastructure host 30). The server hardware resources 33 are, for example, a processor 331 such as a Central Processing Unit (CPU) or a Graphics Processing Unit (GPU), a memory 332 such as a Random Access Memory (RAM), a Network Interface Card (NIC) 333, etc., but are not limited thereto.

The virtual infrastructure management server 40 generates a virtual desktop environment (virtual machine 31) in the virtual infrastructure host 30 and releases server hardware resources 33 being used by the virtual machine 31. The session management server 50 manages a session between the virtual desktop environment (virtual machine 31) generated in the virtual infrastructure host 30 and the user terminal 20.

The reservation management server 60 receives and manages the usage reservation information (hereinafter referred to simply as "usage reservation") received from the user terminal 20 and executes processing for assigning the usage reservation information to the virtual machine based on a predetermined algorithm. As illustrated in FIG. 2, the reservation management server 60 includes a reception unit 61, a control unit 62, an extraction unit 63, and an assignment unit 64.

The reception unit 61 receives the usage reservation information including a type (PC environment) and a usage time zone of a virtual machine 31 capable of executing an application 311. That is, the reception unit 61 receives the usage reservation of the application 311 executed in the virtual machine 31 for each predetermined usage time period. The reception unit 61 stores the received usage reservation information in order, and outputs it to the control unit 62 in order from the first received usage reservation information.

The control unit 62 registers the usage reservation information in the usage reservation information table 74 until the number of the usage reservation information in the usage time zone reaches a predetermined total number (upper limit number) of the virtual machines 31 which can operate simultaneously. When the number of the usage reservation information exceeds the predetermined total number, an error of reservation impossible is outputted. That is, the control unit 62 permits reception until the number of registered usage reservation information reaches the predetermined total number.

The extraction unit 63 extracts usage reservation information whose time from the current time to the start time is within a predetermined time, and outputs it to the assignment unit 64. The predetermined time in the present example embodiment is set to five minutes in consideration of the generation processing time of the virtual machine 31 (virtual desktop environment), but the predetermined time is not limited to five minutes.

The assignment unit 64 assigns usage reservation information to any one of virtual machines 31 with respect to a usage time zone, and provides the usage environment (PC environment) of the application 311 by the virtual machine 31 to the user. For example, the assignment unit 64 assigns usage reservation information for using the PC environment X (PC environment ID: Env-X) from thirteen o'clock to fourteen o'clock to the virtual machine 31 corresponding to the PC environment X five minutes before the start time (thirteen o'clock). Then, the assignment unit 64 cancels the assignment at the end time (fourteen o'clock). That is, the assignment unit 64 requests the virtual infrastructure management server 40 to release the server hardware resources 33 used by the virtual machine 31. If the time until the server hardware resources 33 are released is five minutes, as in the case of the generation of the virtual machine 31, the usage reservation from thirteen o'clock to fourteen o'clock denotes that the processing reservation from 12:55 to 14:05 is internally performed.

The shared database 70 is a database shared among the virtual infrastructure host 30, the virtual infrastructure management server 40, the session management server 50, and the reservation management server 60. The shared database 70 includes a user information table 71, a PC environment management table 72, an upper limit number setting table 73, a usage reservation information table 74, and an assignment information table 75. Each table will be described below. However, the data items of each table are examples, and are not limited to the data items illustrated in the figure.

FIG. 3 is a diagram illustrating an example of information stored in the user information table 71. Here, the user information table 71 includes a user ID unique to each user, a name, a user classification, a student number, a study code of a course for which completion registration has been performed, a registered face image, an address, contacts, and a login password as data items. There are two types of user classification according to the present example embodiment, a personal (student) and an administrator (teacher), and the user classification illustrates the authority of the user in this system. The registered face image is, for example, a face image of a student ID card of a university.

FIG. 4 is a diagram illustrating an example of information stored in the PC environment management table 72. Here, the PC environment management table 72 has a PC environment ID which is unique to each PC environment, a PC environment name, an application ID, and a virtual machine ID as data items. The term "PC environment" in the present example embodiment indicates an operating environment (virtual desktop environment) of the virtual machine 31, that is, a type of the virtual machine 31. For example, different PC environment IDs and PC environment names are set for a virtual desktop environment in which a Virtual Reality (VR) application 311 can be used and a virtual desktop environment in which a Computer Aided Design (CAD) application 311 can be used. The same PC environment ID is associated with one or more virtual machine IDs. Therefore, when a certain PC environment ID is specified, the virtual machine ID associated with the PC environment ID can be an assignment candidate of the usage reservation information.

FIG. 5 is a diagram illustrating an example of information stored in the upper limit number setting table 73. Here, the upper limit number setting table 73 has the PC environment ID, a date, a slot No, an upper limit number, and a remaining number as data items. The slot No is a sequence number of a usage time zone (hereinafter referred to as "slot") obtained by time-dividing a day (24 hours) by a predetermined time length. According to the present example embodiment, a case where one slot is for five minutes will be described as an example. The upper limit number means the number of virtual machines 31 that can be operated simultaneously. The upper limit number is previously defined based on the server hardware resources 33 and the number of licenses of the application 311. The remaining number is the number obtained by subtracting the number of pieces of usage reservation information by the user from the upper limit number.

FIG. 6 is a diagram illustrating an example of information stored in the usage reservation information table 74. Here, the usage reservation information table 74 includes a reservation ID which is unique to each usage reservation, the user ID, the PC environment ID, a reservation date, a reservation start time, a reservation end time, a start slot No, an end slot No, a reservation status, a registrant classification, and a machine assigned to reservation as data items.

The reservation ID is, for example, a sequence number issued in order of reception of the usage reservation information. The reservation status indicates a status of the usage reservation information. The reservation status includes "Reserved", "In the process of assignment", "Assigned", and the like. The registrant category is a category for classifying the registrant of the usage reservation information. In the registrant section according to the present example embodiment, a user classification (see FIG. 3) of the user who has made a reservation of usage is set. The machine assigned to reservation is the virtual machine ID of the virtual machine 31 to which the usage reservation information is assigned.

FIG. 7 is a diagram illustrating an example of information stored in the assignment information table 75. Here, the assignment information table 75 includes the virtual machine ID, the PC environment ID, the date, the slot No, the reservation ID, and the user ID as data items.

Figure 8:
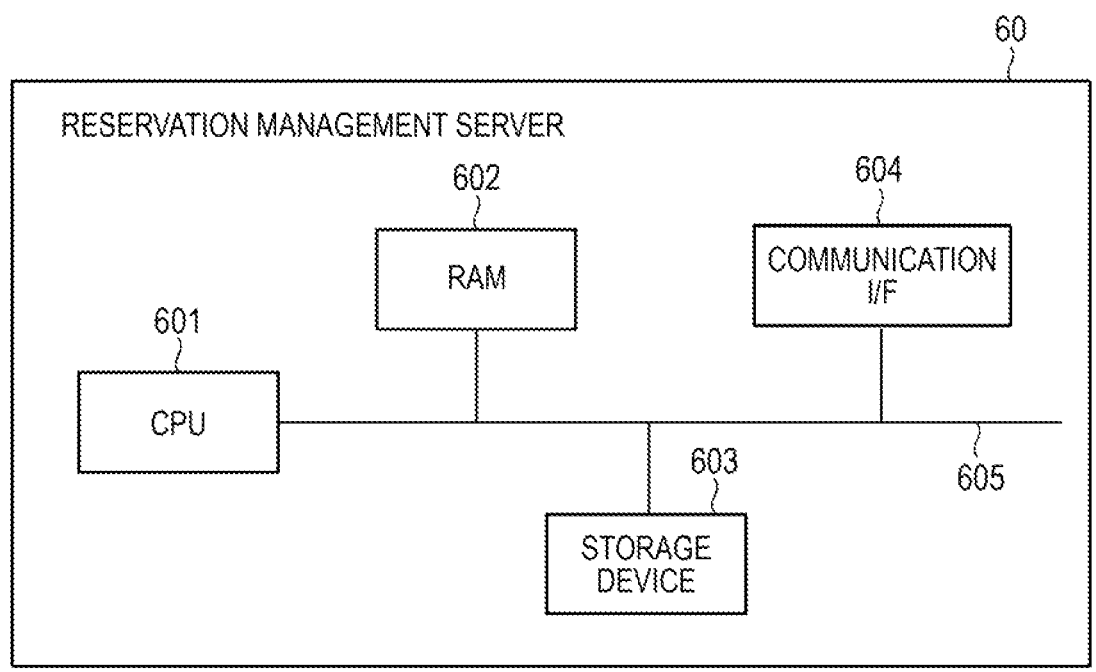
FIG. 8 is a block diagram illustrating an example of a hardware configuration of a reservation management server according to the first example embodiment.

FIG. 8 is a block diagram illustrating an example of the hardware configuration of the reservation management server 60. Since the virtual infrastructure host 30, the virtual infrastructure management server 40, and the session management server 50 have the same hardware configuration as that of the reservation management server 60, the reservation management server 60 will be described below by way of example.

As illustrated in FIG. 8, the reservation management server 60 includes a CPU 601, a RAM 602, a storage device 603, and a communication I/F 604. Each device is connected to a bus line 605.

The CPU 601 is a processor that performs a predetermined operation according to a program stored in the storage device 603 and has a function of controlling each part of the reservation management server 60. In the reservation management server 60, the CPU 601 functions as the reception unit 61, the control unit 62, the extraction unit 63, the assignment unit 64, etc. The RAM 602 is composed of a volatile storage medium and provides a temporary memory area necessary for the operation of the CPU 601.

The storage device 603 is composed of a storage medium such as a nonvolatile memory, a hard disk drive, etc., and functions as a storage unit. The storage device 603 stores a program executed by the CPU 601, data referred to by the CPU 601 when the program is executed, and the like.

The communication I/F 604 is a communication interface based on standards such as Ethernet (Registered trademark), Wi-Fi (Registered trademark), 4G, etc., and is a module for communicating with connection devices, etc.

Note that the hardware configuration illustrated in FIG. 8 is an example, and devices other than these may be added or some devices may not be provided. Some devices may also be replaced by other devices having similar functions. Further, some functions of the present example embodiment may be provided by other devices via the network NW, and functions of the present example embodiment may be realized by being distributed to a plurality of devices. For example, the storage device 603 may be replaced with cloud storage.

Next, the operation of the information processing system 1 configured as described above will be described.
[Registration of Usage Reservation Information]

Figure 9:
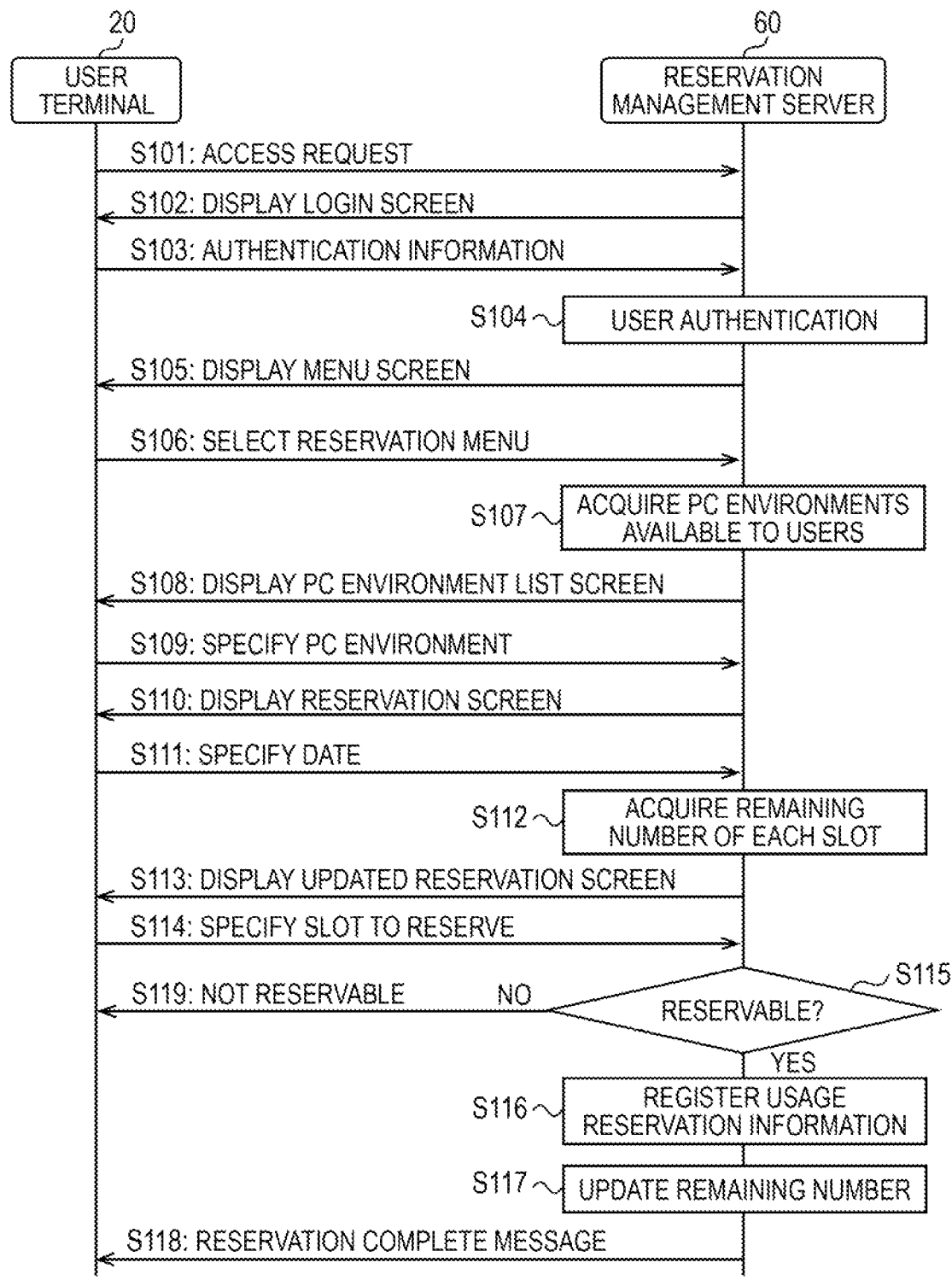
FIG. 9 is a sequence diagram illustrating an example of registration processing of usage reservation information according to the first example embodiment.

FIG. 9 is a sequence diagram illustrating an example of registration processing of the usage reservation information. This processing is executed every time the user reserves the usage of the virtual machine 31.

First, the user operates the user terminal 20 to transmit an access request to the WEB site provided by the reservation management server 60 (step S101). The reservation management server 60 causes the user terminal 20 to display a login screen in response to the access request from the user terminal 20 (step S102).

Figure 10:
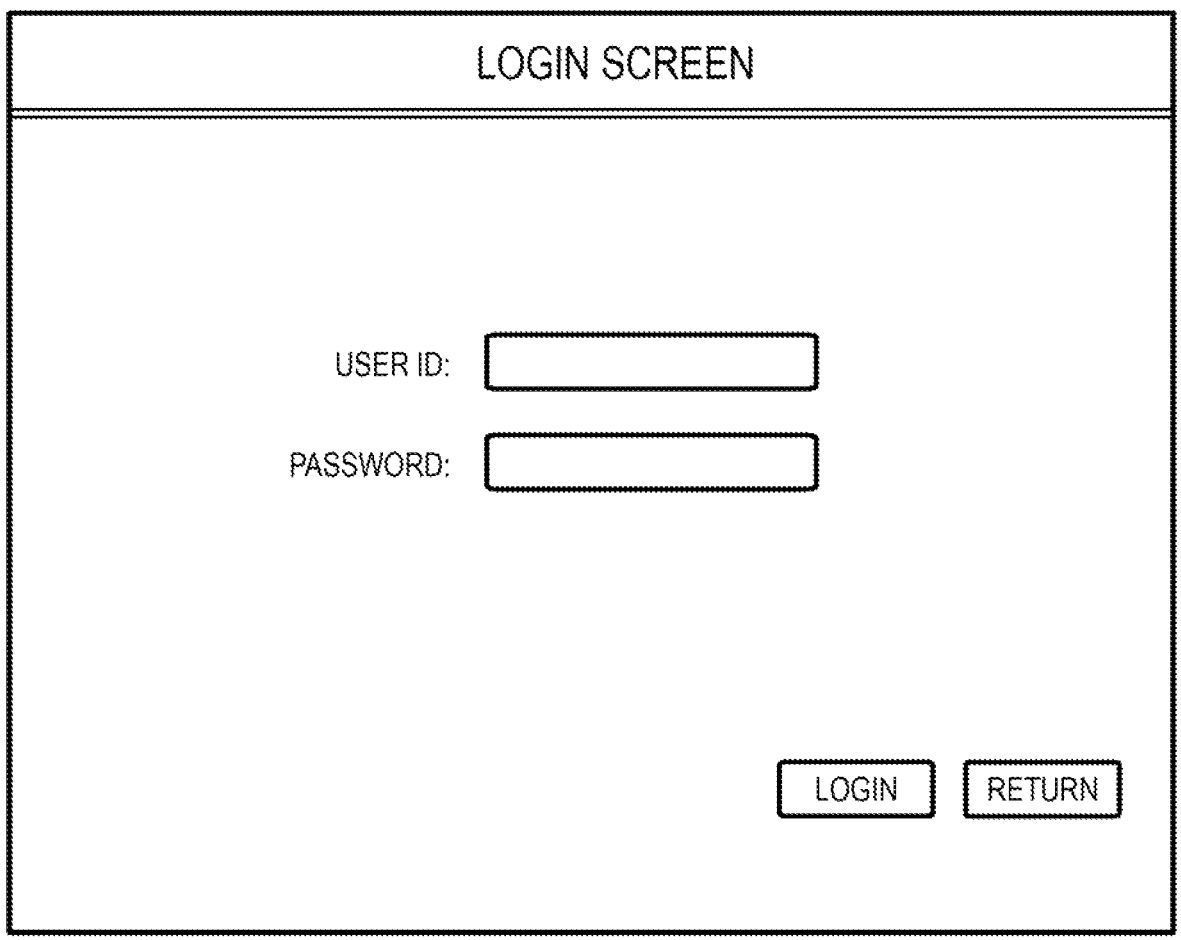
FIG. 10 is a diagram illustrating an example of a login screen displayed on a user terminal according to the first example embodiment.

FIG. 10 is a diagram illustrating an example of the login screen. Here, a field for inputting a user ID and a password is displayed. The authentication information used at the time of login is not limited to the password. As the authentication information, information recorded in an IC card possessed by the user or biometrics information may be used.

Next, the user terminal 20 transmits the authentication information input on the login screen to the reservation management server 60 (step S103). Accordingly, the reservation management server 60 performs user authentication (step S104).

Next, when the user authentication is successful, the reservation management server 60 causes the user terminal 20 to display a menu screen (step S105).

Next, the user terminal 20 transmits the information of the reservation menu selected on the menu screen to the reservation management server 60 (step S106). Accordingly, the reservation management server 60 refers to the user information table 71 based on the user ID, and acquires information regarding the PC environment that the user can use (step S107).

Next, the reservation management server 60 causes the user terminal 20 to display a PC environment list screen based on the acquired information (step S108). FIG. 11 is a diagram illustrating an example of the PC environment list screen. Here, a list of PC environments illustrating the relationship among the PC environment ID, the OS, and the available applications is displayed on the screen, it is indicated that the desired PC environment is selected by the user.

Next, the user terminal 20 transmits the PC environment ID specified on the PC environment list screen to the reservation management server 60 (step S109). Accordingly, the reservation management server 60 causes the user terminal to display a reservation screen related to the PC environment specified by the user (step S110).

Next, the user terminal 20 transmits the date specified in the reservation screen to the reservation management server 60 (step S111). Accordingly, the reservation management server 60 refers to the upper limit number setting table 73 and acquires the remaining number of each slot on the specified date (step S112).

Next, the reservation management server 60 causes the user terminal 20 to display the reservation screen which is updated based on the acquired information of the slot number and the remaining number (step S113).

FIG. 12 is a diagram illustrating an example of the reservation screen. Here, the PC environment ID specified by the user, the usable application, the specified date, a time chart indicating the slot availability on the same date, and a form for designating the usage start time and the usage end time are displayed. Reference numeral "A" indicates a time zone in which the remaining number corresponding to the specified PC environment ID is zero and reservation is not possible. Reference numeral "B" indicates a time zone selected by the user operation. The user can easily designate the usage start time and the usage end time by inputting the usage start time and the usage end time into the form described above or by dragging on the time chart as indicated by the reference numeral "B".

Next, the user terminal 20 transmits the reservation slot No specified in the reservation screen to the reservation management server 60 (step S114). Accordingly, the reservation management server 60 determines whether or not the usage reservation information can be registered in the usage reservation information table 74 (step S115). Here, when the reservation management server 60 determines that the usage reservation information can be registered in the usage reservation information table 74 (YES in step S115), the process proceeds to step S116.

On the other hand, when the reservation management server 60 determines that the usage reservation information cannot be registered in the usage reservation information table 74 (NO in step S115), the reservation management server transmits a not-reservable message to the user terminal 20 (step S119). For example, it corresponds to a case in which the usage reservation information of another user is registered in advance while the user performs an input operation on the reservation screen, and the remaining number changes and the reservation becomes impossible.

In step S116, the reservation management server 60 registers the usage reservation information in the usage reservation information table 74. Accordingly, when the reservation management server 60 updates the remaining number stored in the upper limit number setting table 73 (step S117), the reservation management server 60 transmits a reservation complete message to the user terminal 20 (step S118).

Figure 13A:
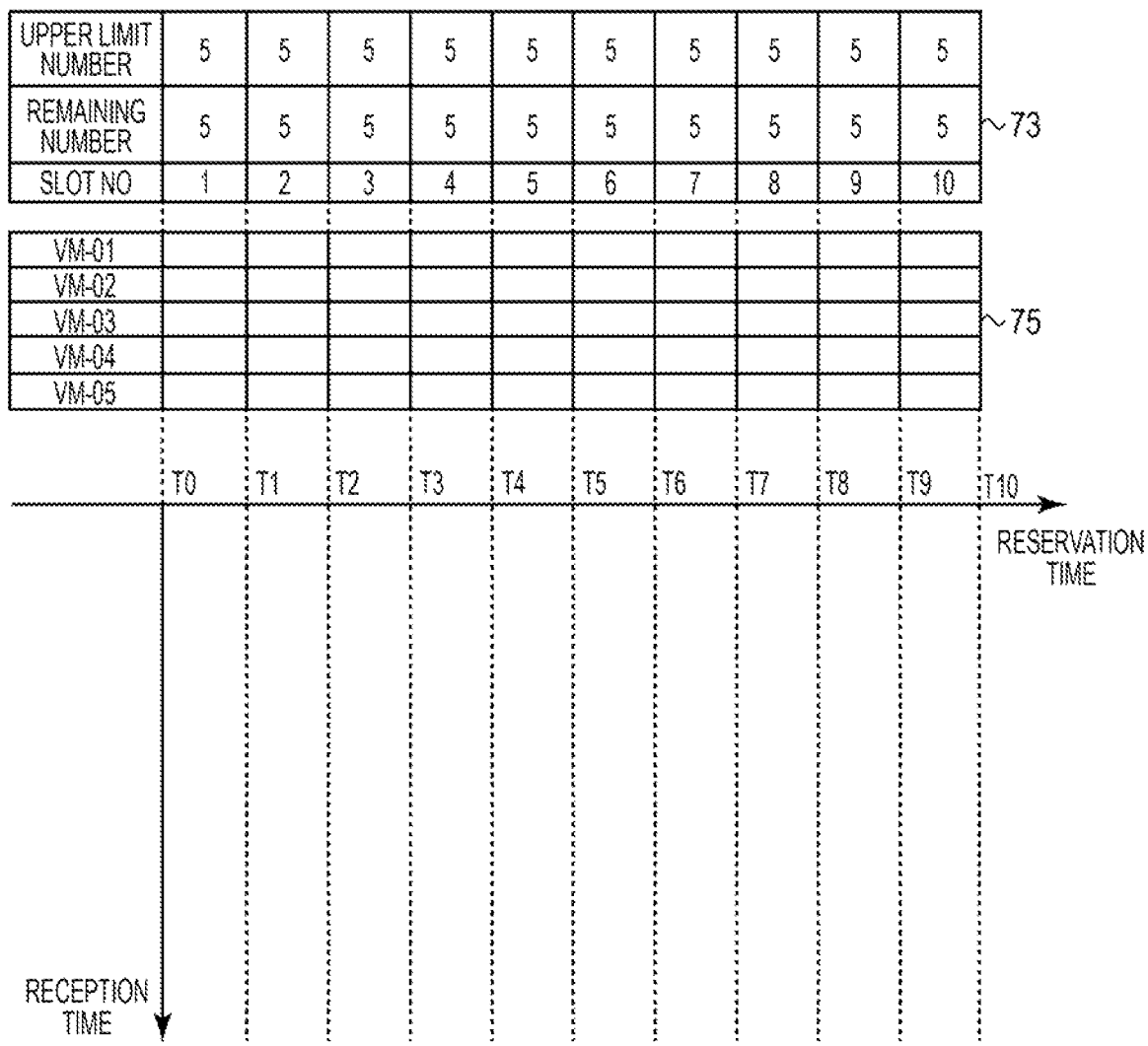
FIG. 13A is an explanatory diagram of a reservation algorithm according to the first example embodiment.
Figure 13B:
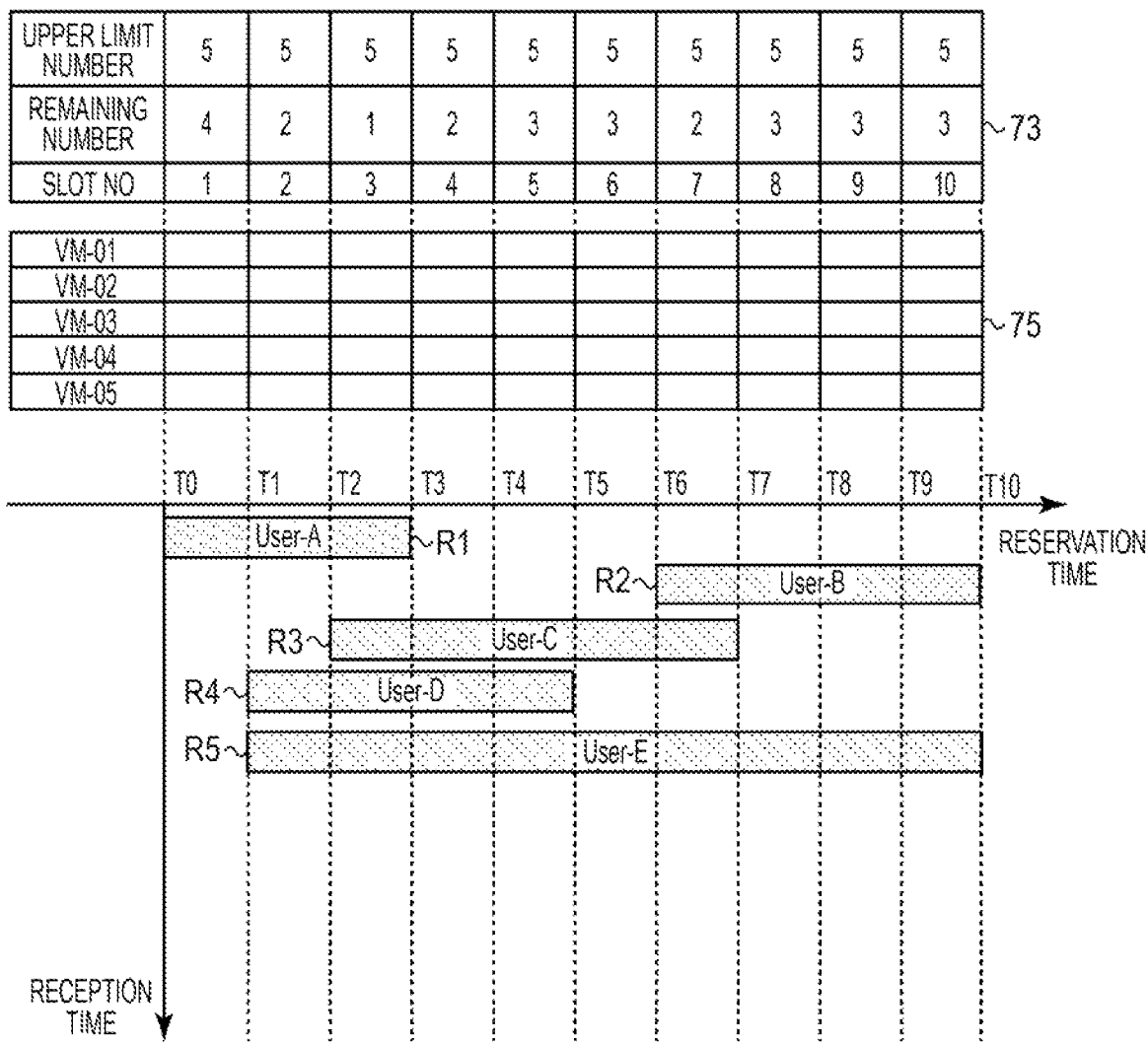
FIG. 13B is an explanatory diagram of the reservation algorithm according to the first example embodiment.
Figure 13C:
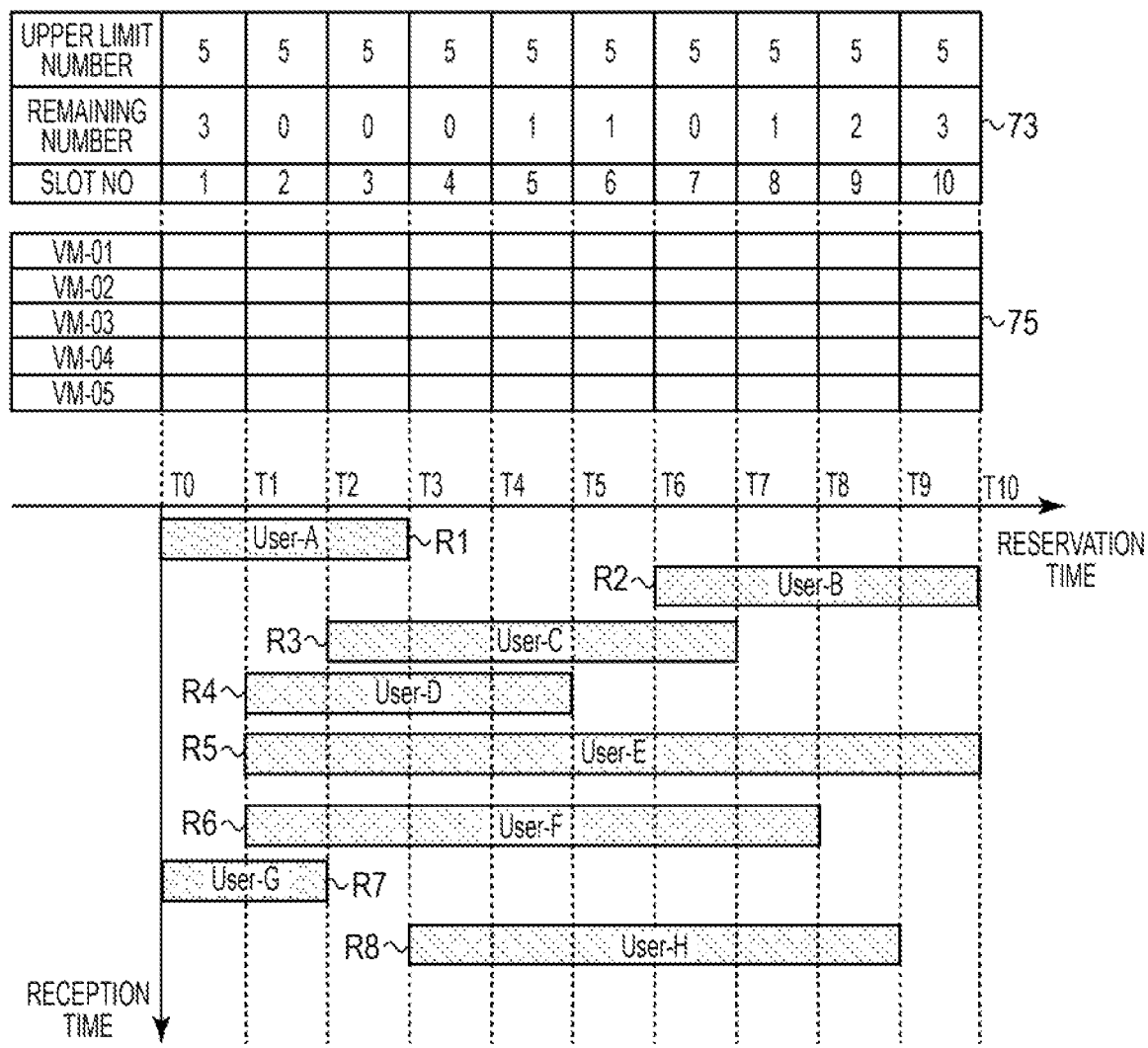
FIG. 13C is an explanatory diagram of the reservation algorithm according to the first example embodiment.

FIGS. 13A to 13C are explanatory diagrams of a registration algorithm (reservation algorithm) of usage reservation information. In FIGS. 13A to 13C, the upper limit number setting table 73 and the assignment information table 75 are displayed in association with a time axis in the horizontal direction indicating a reservation time. A time axis in the vertical direction indicates the received time of reservations.

FIG. 13A illustrates an initial state in which no usage reservation information is registered for each usage time zone in which the slot No is "1" to "10". In the initial state, the remaining number stored in the upper limit number setting table 73 is "5", which is the same as the upper limit number.

On the other hand, FIG. 13B illustrates a state in which the usage reservation information R1 of the User-A, the usage reservation information R2 of the User-B, the usage reservation information R3 of the User-C, the usage reservation information R4 of the User-D, and the usage reservation information R5 of the User-E are received in order and registered in the usage reservation information table 74 for the same usage time period.

For example, the usage reservation information R1 of the User-A is a reservation whose slot numbers are from "1" to "3". When these five pieces of usage reservation information R1 to R5 are registered, the remaining number in each slot is updated. For example, for the slot whose slot No is "3", since four pieces of usage reservation information of usage reservation information R1, R3, R4, and R5 are registered, the remaining number is updated from "5" to "1". In this case, it denotes that only one usage reservation information can be registered for the slot whose slot No is "3".

FIG. 13C illustrates a state in which the usage reservation information R6 of the User-F, the usage reservation information R7 of the User-G, and the usage reservation information R8 of the User-H are received and registered in order with respect to the registration state illustrated in FIG. 13B. The usage reservation information R6 of the User-F is a reservation whose slot numbers are from "2" to "8". The usage reservation information R7 of the User-G is a reservation whose slot numbers are from "1" to "2". The usage reservation information R8 of the User-H is a reservation whose slot numbers are from "4" to "9". For example, in the slot whose slot No is "2", since two pieces of usage reservation information of usage reservation information R6 and R7 are newly registered, the remaining number is updated from "2" to "0". Therefore, in the slot whose slot No is "2", registration is limited even if new usage reservation information is received.

In this way, the usage reservation information R1 to R8 is received in order until the number of reservations in each slot reaches a predetermined upper limit number, and then registered in the usage reservation information table 74 in accordance with the reception order.

In FIGS. 13A to 13C, it is also illustrated that the assignment information table 75 is not updated in the reservation stage of the usage reservation information R1 to R8. That is, the present example embodiment doesn't have to identify virtual machines at the reservation stage. The assignment of the usage reservation information to each virtual machine (from VM-01 to VM-05) is executed at a timing different from that of the reservation.

[Assignment of Usage Reservation Information]

FIG. 14 is a flowchart illustrating an example of the usage reservation information assignment processing. This processing is repeatedly executed at a predetermined cycle in the reservation management server 60.

First, the reservation management server 60 extracts, from among the usage reservation information table 74, usage reservation information whose start time is within a fixed time (for example, five minutes) from the current time (step S201).

Next, the reservation management server 60 determines whether or not the extracted usage reservation information exists (step S202). Here, when the reservation management server 60 determines that there is the extracted usage reservation information (YES in step S202), the process proceeds to step S203. On the other hand, when the reservation management server 60 determines that there is no extracted usage reservation information (NO in step S202), the processing of FIG. 14 ends.

In step S203, the reservation management server 60 sequentially selects the usage reservation information from the extracted usage reservation information according to the order of reception.

Next, the reservation management server 60 determines the virtual machine to which the selected usage reservation information is assigned, based on a predetermined assignment algorithm (step S204). Details of the assignment algorithm will be described later.

Next, the reservation management server 60 requests the virtual infrastructure management server 40 to generate the virtual machine 31 to which the usage reservation information is assigned (step S205). At this time, the reservation management server 60 updates the reservation status of the usage reservation information which is stored in the usage reservation information table 74 and is to be assigned, from "Reserved" to "In the process of assignment". In response to a request from the reservation management server 60, the virtual infrastructure management server 40 generates a virtual machine 31 in the virtual infrastructure host 30.

Next, the reservation management server 60 updates the reservation status of the assigned usage reservation information stored in the usage reservation information table 74 from "In the process of assignment" to "Assigned" (step S206). The virtual machine ID of the virtual machine to be assigned is set to the machine assigned to reservation in the usage reservation information table 74.

Then, the reservation management server 60 determines whether the assignment of all the usage reservation information is completed (step S207). Here, when the reservation management server 60 determines that the assignment of all the usage reservation information has been completed (YES in step S207), the process of FIG. 14 ends. On the other hand, when the reservation management server 60 determines that the assignment has not been completed (NO in step S207), the process returns to step S203.

FIGS. 15A to 15D are explanatory diagrams of the assignment algorithm of the usage reservation information. In FIGS. 15A to 15D, an upper limit number setting table 73 and an assignment information table 75 are displayed in association with a time axis in the horizontal direction indicating a reservation time. A time axis in the vertical direction indicates the received time of reservations.

The assignment of the usage reservation to the five virtual machines is performed in accordance with a predetermined assignment priority (In the present example embodiment, the order of assignment priority is VM-01, VM-02, VM-03, VM-04, and VM-05). The length of the predetermined time ΔT will be described below as being the same as the length of one slot.

Figure 15A:
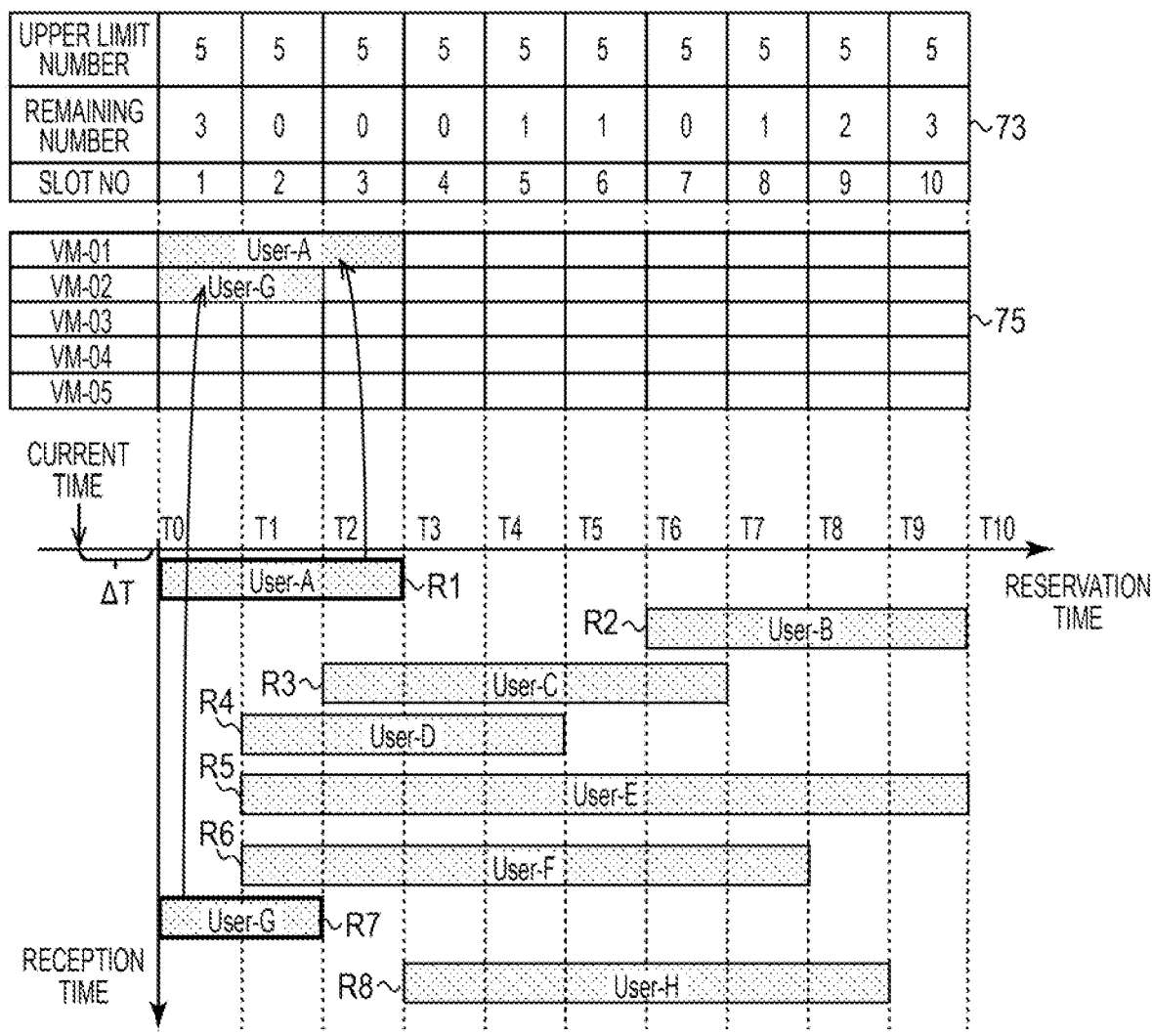
FIG. 15A is an explanatory diagram of the assignment algorithm according to the first example embodiment.

FIG. 15A illustrates a case where, when the current time reaches a time which is within a predetermined time ΔT from the start time (time T0) of the slot whose slot No is "1", the usage reservation information R1, R7 starting from the slot whose slot No is "1" is assigned to the virtual machine.

First, when the usage reservation information R1 whose order of reception is earlier is selected, the usage reservation information R1 is assigned to the virtual machine VM-01 having the highest assignment priority. Next, the remaining usage reservation information R7 is selected, but the usage reservation information R1 has already been assigned to the virtual machine VM-01 concerning the same reservation time. That is, the usage reservation information R7 is not assigned to the virtual machine VM-01 having the highest assignment priority. Therefore, the usage reservation information R7 is assigned to the virtual machine VM-02 having the second assignment priority.

Figure 15B:
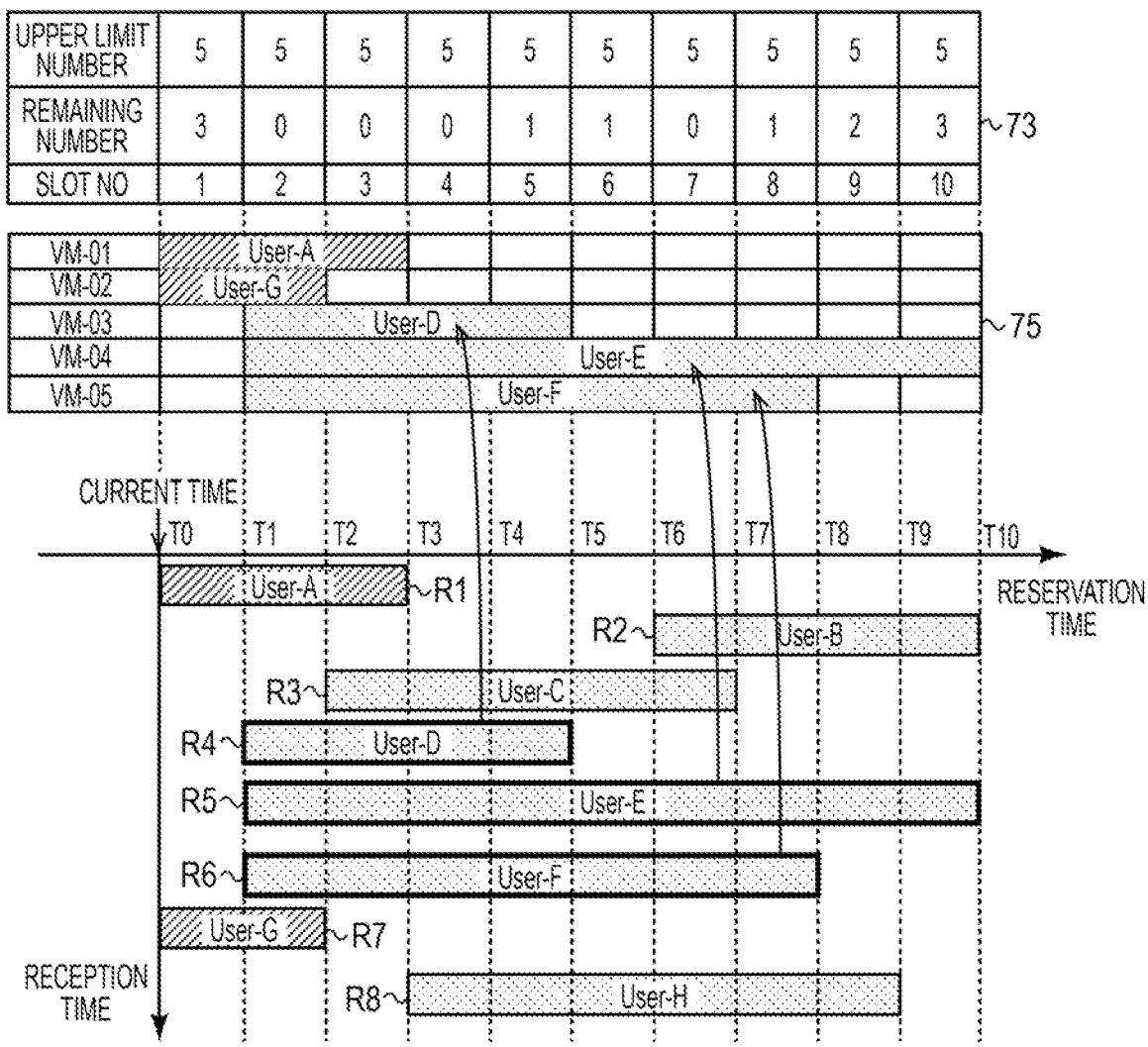
FIG. 15B is an explanatory diagram of the assignment algorithm according to the first example embodiment.

FIG. 15B illustrates a case where, when the current time reaches a time (That is, time T0) which is within a predetermined time ΔT from the start time (time T1) of the slot of which slot No is "2", the usage reservation information R4, R5, and R6 starting from the slot of which slot No is "2" is assigned to a virtual machine having an empty slot.

First, although the usage reservation information R4 whose reception order is the first among the three items is selected, the usage reservation information R1 and R7 have already been assigned respectively to the virtual machines VM-01 and VM-02 concerning the same reservation time (Especially Slot No: "2", "3"). Therefore, the usage reservation information R4 is not assigned to the virtual machines VM-01 and VM-02. The usage reservation information R4 is assigned to the virtual machine VM-03 whose assignment priority is the third.

Next, although the usage reservation information R5 whose reception order is the second among the three items is selected, the usage reservation information R1, R7, and R4 have already been assigned respectively to the virtual machines VM-01 to VM-03 concerning the same reservation time (Especially slot No: "2", "3"). Therefore, the usage reservation information R5 is not assigned to the virtual machines VM-01 to VM-03. The usage reservation information R5 is assigned to the virtual machine VM-04 whose assignment priority is the fourth.

Finally, although the usage reservation information R6 whose reception order is the third among the three items is selected, the usage reservation information R1, R7, R4, and R5 have already been assigned respectively to the virtual machines VM-01 to VM-04 concerning the same reservation time (Especially slot No.: "2" to "5"). Therefore, the usage reservation information R6 is not assigned to the virtual machines VM-01 to VM-04. The usage reservation information R6 is assigned to the virtual machine VM-05 whose assignment priority is the fifth.

Figure 15C:
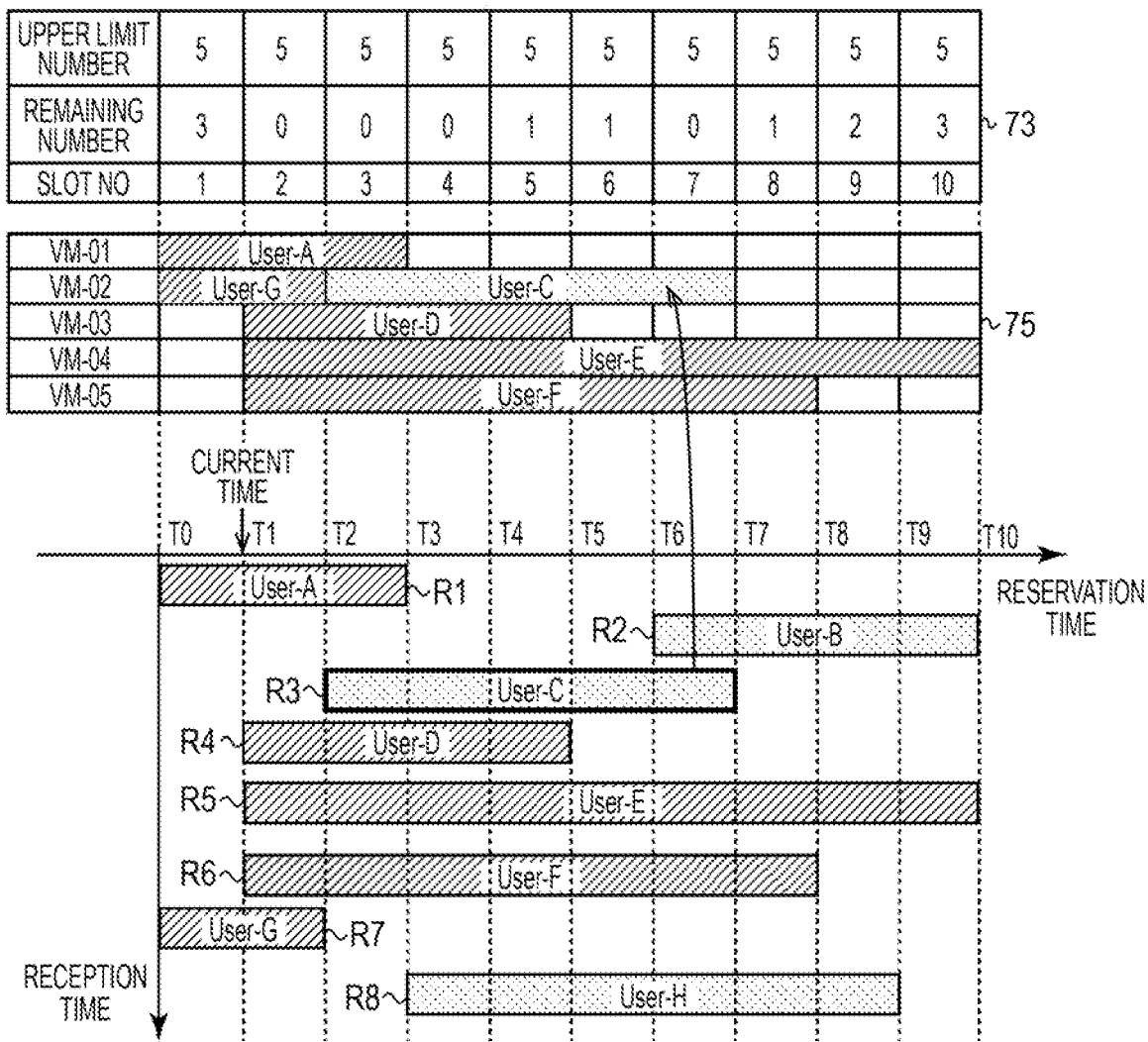
FIG. 15C is an explanatory diagram of the assignment algorithm according to the first example embodiment.

FIG. 15C illustrates a case where, when the current time reaches a time (i.e., time T1) which is within a predetermined time ΔT from the start time (time T2) of the slot of which slot No is "3", the usage reservation information R3 starting from the slot of which slot No is "3" is assigned to a virtual machine having an empty slot. Also in this case, the usage reservation information R3 is assigned to the assignable virtual machine based on the assignment priority. Since the usage reservation information R3 is a reservation in which the slot numbers are from "3" to "7", it is not assigned to the highest virtual machine VM-01. However, with respect to the virtual machine VM-02 having the second assignment priority, the assignment of the usage reservation information R7 of the User-G ends with the slot No of "2". Therefore, the usage reservation information R3 is assigned to the virtual machine VM-02.

Figure 15D:
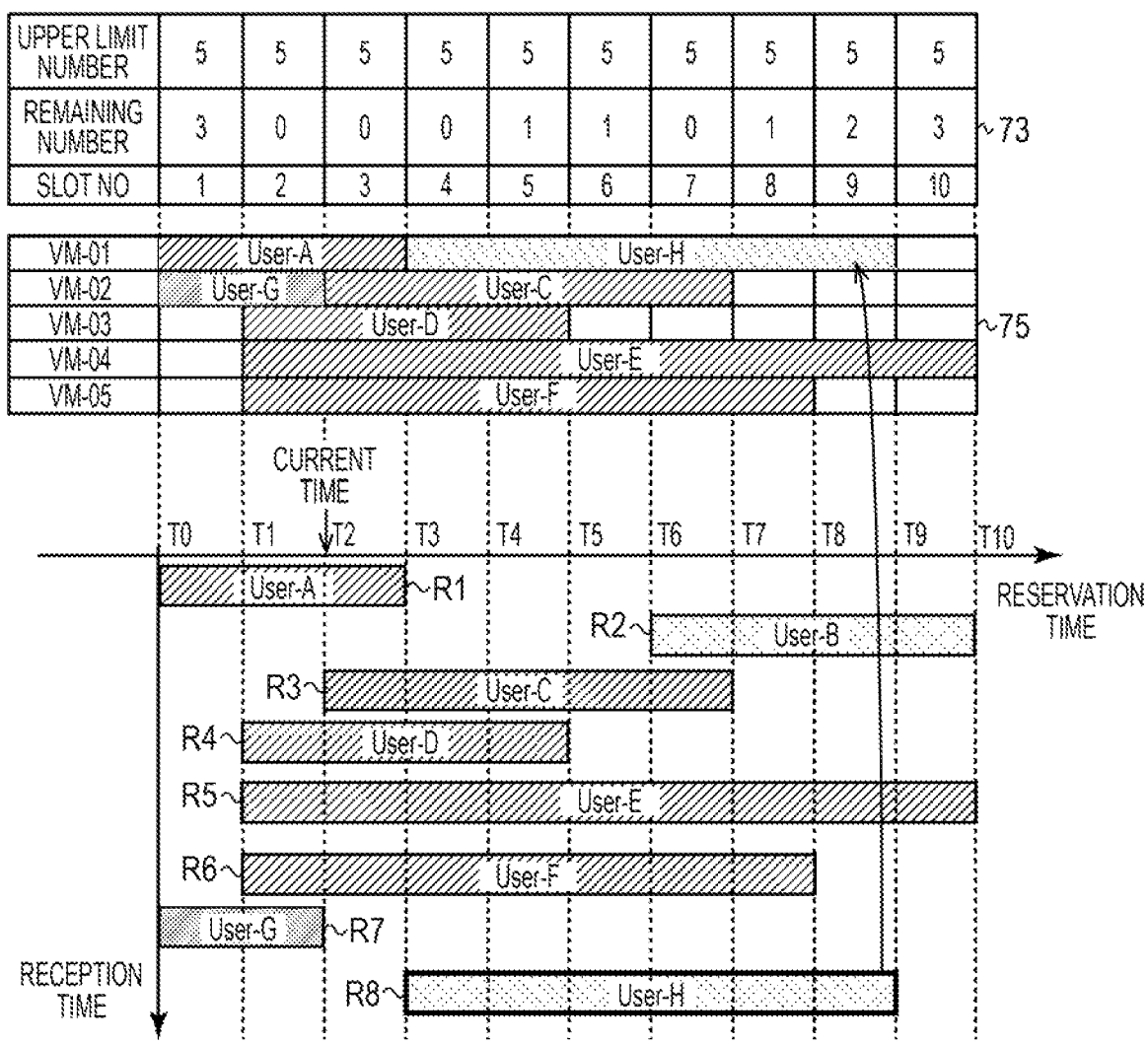
FIG. 15D is an explanatory diagram of the assignment algorithm according to the first example embodiment.

FIG. 15D illustrates a case where, when the current time reaches a time (i.e., time T2) which is within a predetermined time ΔT from the start time (time T3) of the slot of which slot No is "4", the usage reservation information R8 starting from the slot of which slot No is "4" is assigned to a virtual machine having an empty slot. Also in this case, the usage reservation information R8 is assigned to the assignable virtual machine based on the assignment priority. The usage reservation information R8 is a reservation in which the slot numbers are from "4" to "9". These slots are vacant in the highest virtual machine VM-01. Therefore, the usage reservation information R8 is assigned to the virtual machine VM-01.

[Batch Reservation]

Figure 16:
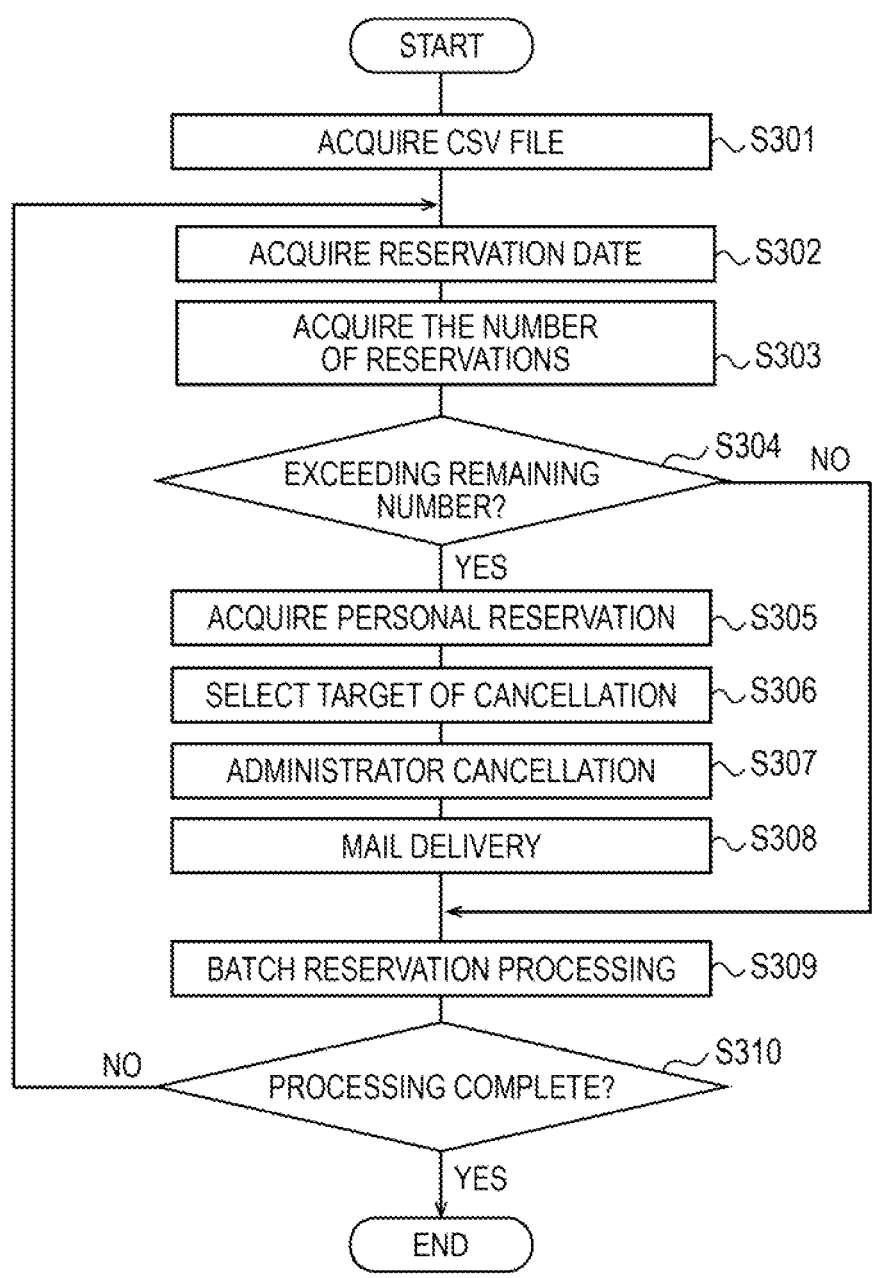
FIG. 16 is a flowchart illustrating an example of batch reservation processing according to the first example embodiment.

FIG. 16 is a flowchart illustrating an example of the batch reservation processing. This processing is executed based on an operation by an administrator such as a teacher, for example, at a timing when the curriculum of a university class and the number of subject persons to be taken have been determined or at a timing when the number of persons to be taken has increased.

First, the reservation management server 60 acquires the CSV file uploaded from the user terminal 20 via the management screen (step S301).

FIG. 17 is a diagram illustrating an example of the administrator screen. Here, the file name of the CSV file specified by the administrator is described at the upper part of the column of the CSV batch processing. When the administrator presses an upload button, the CSV file is uploaded to the reservation management server 60. A form for inputting the class ID and the period and a download button are provided at the lower part of the column of the CSV batch processing.

Next, the reservation management server 60 acquires the reservation date and the number of reservations from the CSV file (steps S302 and S303).

Next, the reservation management server 60 determines whether or not the remaining number of the specified slots of the same date is exceeded when the number of reservations is registered on the acquired reservation date (step S304). When it is determined that the remaining number of the specified slots is exceeded (YES in step S304), the process proceeds to step S305. On the other hand, when it is determined that the remaining number of the specified slots is not exceeded (NO in step S304), the process proceeds to step S309.

In step S305, the reservation management server 60 acquires all personal reservations which are already registered in a target slot overlapping the class time on the reservation date.

Next, the reservation management server 60 selects a personal reservation to be a target of cancellation (step S306). More specifically, the acquired usage reservation information is sorted so that the order of reception is in descending order, and the usage reservation information is selected from the last one in the order of reception.

The usage reservation information is repeatedly selected until the remaining number becomes the same as the number of reservations. For example, it is assumed that the upper limit number of slots corresponding to class hours of a class is 40, and assignment of 38 machines is required for the class. Assuming that the usage reservation for five machines has already been registered for the purpose of self-study, the remaining number is 35. Therefore, in order to register the usage reservation for 38 machines, the reservation management server 60 cancels the usage reservation for three machines.

Next, when the reservation management server 60 executes cancellation processing based on the administrator authority with respect to the personal reservation to be canceled (step S307), the reservation management server delivers mail to the user relating to the canceled personal reservation (step S308).

Next, when the reservation management server 60 executes the batch reservation processing (step S309), the process proceeds to step S310. The reservation status of the usage reservation information registered in the batch reservation processing is updated to, for example, "administrator reservation". In addition, the reservation status of the usage reservation information of the students canceled according to the batch reservation processing is updated to, for example, "administrator cancellation". Thus, the relation between the registered usage reservation information and the batch reservation processing can be easily grasped.

Then, the reservation management server 60 determines whether or not the reservation processing based on the acquired CSV file is completed (step S310). Here, when the reservation management server 60 determines that the reservation processing is completed (YES in step S310), the processing of FIG. 16 ends. On the other hand, when the reservation management server 60 determines that the reservation processing is not completed (NO in step S310), the processing returns to step S302.

Thus, according to the present example embodiment, the reservation management server 60 can sequentially register the usage reservation information until the predetermined upper limit number is reached, without specifying the virtual machine 31 in the reservation stage. The reservation management server 60 can assign the usage reservation information to the virtual machine 31 whose slot (usage time zone) specified by the usage reservation is vacant. Therefore, a limited number of virtual machines 31 can be efficiently utilized.

The reservation management server 60 extracts usage reservation information in which the time from the current time to the start time is within a predetermined time from among the plurality of pieces of usage reservation information stored in the usage reservation information table 74, and assigns the usage reservation information to the virtual machine 31 available at the start time of the usage reservation information by a predetermined algorithm. That is, the assignment processing of the usage reservation information can be executed at a desired timing apart from the reception timing of the usage reservation information. As a result, the number of users of the virtual machine 31 is maximized. The cost of the server hardware resources 33 for executing the virtual machine 31 and the number of licenses of the contracted application 311 can be suppressed.

According to the present example embodiment, the user selects and reserves a time zone in advance during which the user wants to use the PC environment (In other words, virtual desktop environments) and the PC environment pertaining to the application 311 the user wants to use. Since the reservation management server 60 has completed the start processing of the virtual machine 31 by the reservation start time of the usage reservation information (reservation record), the user can promptly use the virtual machine 31 that have already started at the reservation start time.

The reservation management server 60 assigns the usage reservation information to the virtual machines based on a predefined assignment priority for the plurality of virtual machines. That is, since assignment is performed according to a predetermined rule, it is possible to speed up the assignment processing.

Further, according to the present example embodiment, the reservation management server 60 has a function of batch reservation and batch cancellation based on the administrator authority. Therefore, the administrator such as a teacher can preferentially register the virtual desktop environment to be used in the class at free timing as many times as necessary. Specifically, even when a student has booked a virtual desktop environment for self-study, the administrator will cancel the student's reservation exceptionally. Thus, the administrator can ensure the virtual desktop environment for all the students even when the number of students suddenly increases or when the class hours must be changed due to emergency maintenance.

Second Example Embodiment

A second example embodiment of the present invention will be described below. Reference numerals that are common to the reference numerals denote in the drawings of the first example embodiment indicate the same elements. Description of portions common to the first example embodiment will be omitted, and portions different from the first example embodiment will be described in detail.

Figure 18:
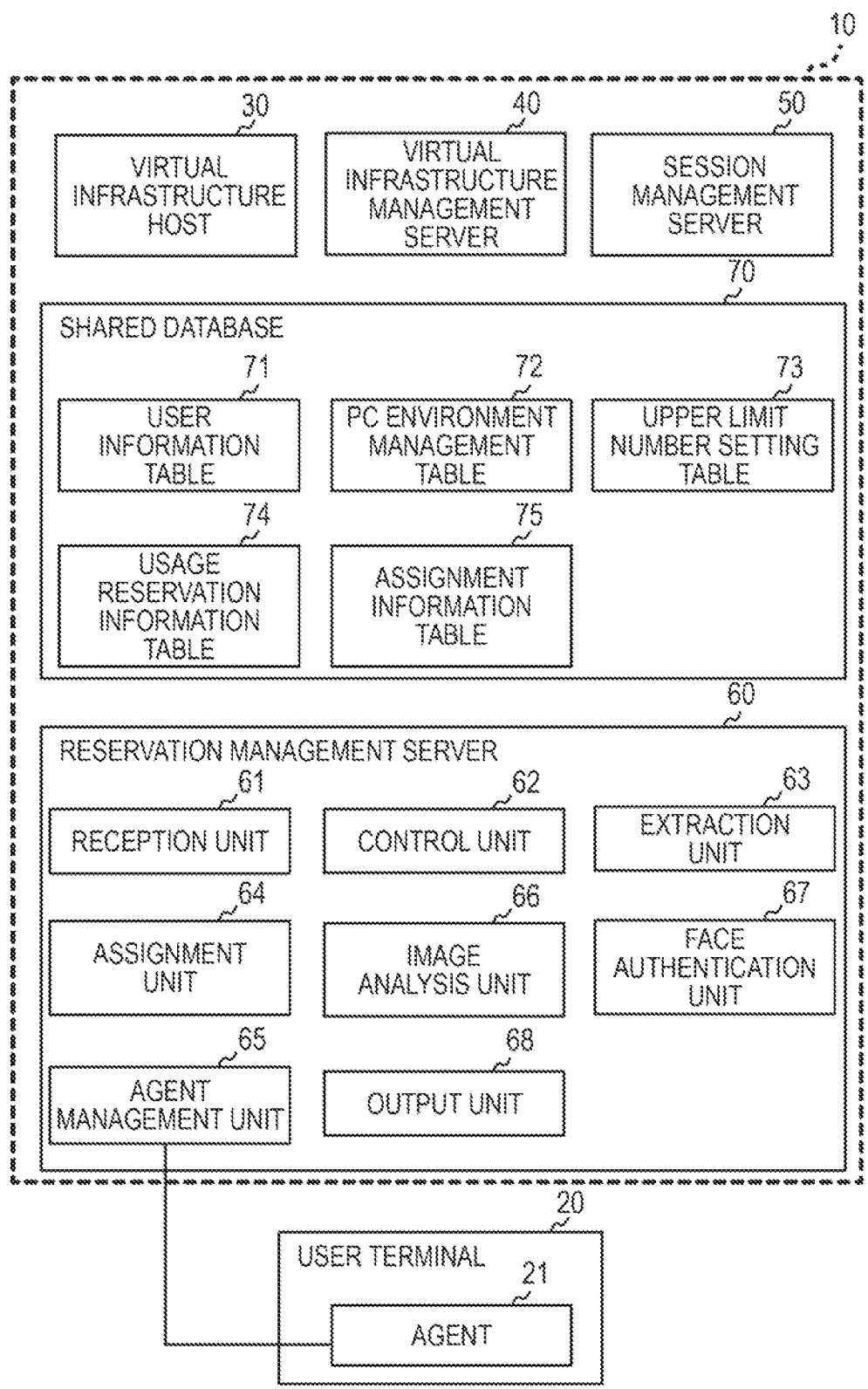
FIG. 18 is a block diagram illustrating an example of the overall configuration of a management server according to a second example embodiment.

FIG. 18 is a block diagram illustrating an example of the overall configuration of the management server 10 according to the second example embodiment. As illustrated in FIG. 18, the present example embodiment differs from the first example embodiment in that the reservation management server 60 further includes an agent management unit 65, an image analysis unit 66, a face authentication unit 67, and an output unit 68.

The agent management unit 65 controls an agent 21 which is a program installed in the user terminal 20. The agent management unit 65 controls the agent 21 to perform capturing processing in an imaging apparatus (not illustrated) such as a digital camera mounted on the user terminal 20. The agent management unit 65 acquires the captured image from the agent 21.

The image analysis unit 66 analyzes the captured image to detect a face image of the user and determines an expression and a behavior of the user in the face image. The image analysis unit 66 determines whether or not the face image of the user is detected during the virtual machine is used. That is, the image analysis unit 66 can determine whether or not the user exists in front of the user terminal 20 by analyzing the captured image. Then, the image analysis unit 66 can also acquire the user's continuous time of leaving a seat and the ratio of the time of leaving the seat with respect to the usage time by counting the time when the user's face image is not detected.

The face authentication unit 67 matches a face image extracted in the image analysis unit 66 with a registered face image of a user (person who made a reservation) stored in the user information table 71. The face authentication unit 67 authenticates whether or not a person who is using or intends to use the virtual machine 31 is the same person as the person who made a reservation based on the result of matching processing.

The output unit 68 outputs information for prompting a user who is using the virtual machine 31 to reserve to the user terminal 20 based on the result of image analysis processing in the image analysis unit 66.

Control Example (1) Based on a Captured Image

Figure 19:
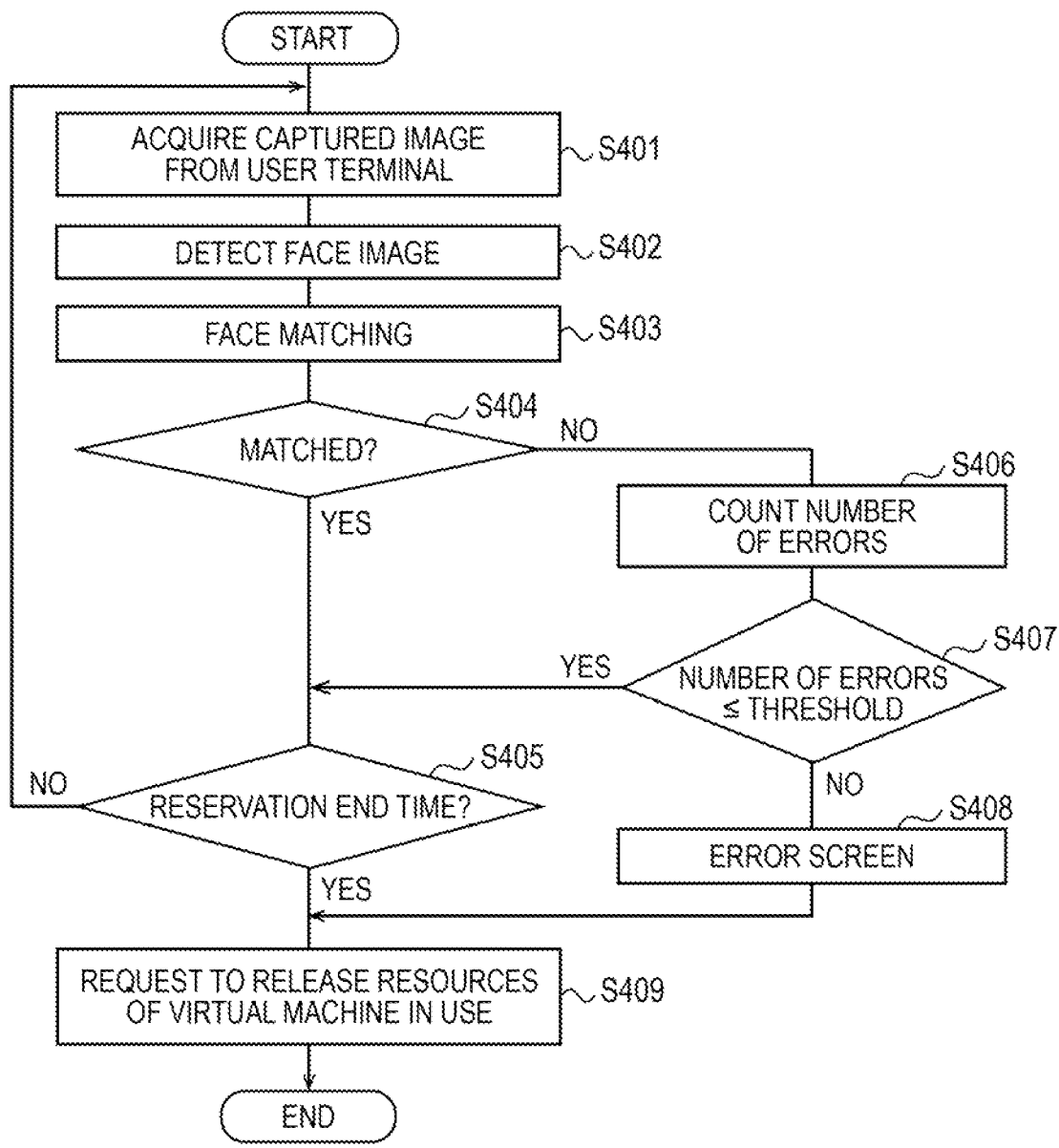
FIG. 19 is a flowchart illustrating an example of control processing based on a captured image according to the second example embodiment.

FIG. 19 is a flowchart illustrating an example of control processing based on the captured image. This processing is repeatedly executed in the user terminal 20 from the start of the usage of the virtual machine 31 to the end thereof. When a plurality of virtual machines 31 are executed simultaneously, the processing of FIG. 19 is executed for each virtual machine 31.

First, the reservation management server 60 requests the user terminal 20 (agent 21) to perform capturing processing, thereby acquiring a captured image from the user terminal 20 (step S401). Next, the reservation management server 60 detects a face image from the captured image (step S402).

Next, the reservation management server 60 performs the face matching between the detected face image, and the registered face image acquired from the user information table 71 by using the user ID as a key (step S403).

Next, the reservation management server 60 determines whether or not a result of the face matching indicates matched (step S404). When the reservation management server 60 determines that the result of the face matching indicates matched (YES in step S404), the process proceeds to step S405. On the other hand, when the reservation management server 60 determines that the result of the face matching indicates not-matched (NO in step S404), the process proceeds to step S406.

In step S405, the reservation management server 60 determines whether or not the current time reaches the reservation end time. When the reservation management server 60 determines that the current time reaches the reservation end time (YES in step S405), the process proceeds to step S409. On the other hand, when the reservation management server 60 determines that the current time does not reach the reservation end time (NO in step S405), the process returns to step S401.

In step S406, the reservation management server 60 counts the number of authentication errors. Next, the reservation management server 60 determines whether or not the number of errors is within a predetermined threshold (step S407). When the reservation management server 60 determines that the number of errors is within the threshold (YES in step S407), the process proceeds to step S405. On the other hand, when the reservation management server 60 determines that the number of errors exceeds the threshold (NO in step S407), the process proceeds to step S408.

Figure 20:
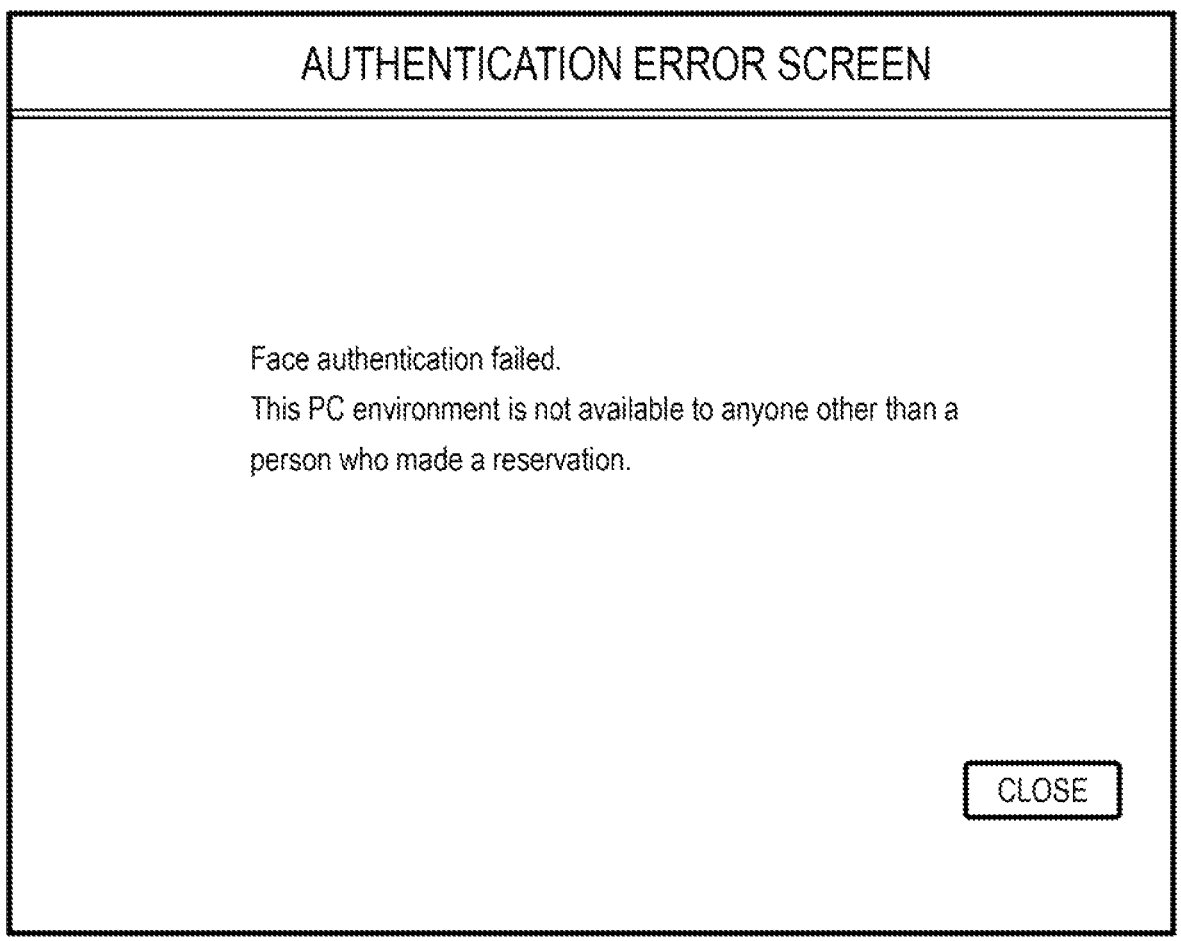
FIG. 20 is a diagram illustrating an example of an authentication error screen displayed on the user terminal according to the second example embodiment.

In step S408, the reservation management server 60 causes the user terminal 20 to display an error screen. Thereafter, the process proceeds to step S409. FIG. 20 is a diagram illustrating an example of an error screen displayed on the user terminal 20. Here, an error message ("Face authentication failed. This PC environment is not available to anyone other than a person who made a reservation.") is displayed when face authentication cannot be performed based on a result of matching of the face image acquired by capturing the user and the registered face image is displayed on the error screen.

In step S409, the reservation management server 60 requests the virtual infrastructure management server 40 to release the resources of the virtual machine 31 being used by the user. Thus, the virtual infrastructure management server 40 releases the resources of the requested virtual machine 31.

Control Example (2) Based on a Captured Image

Figure 21:
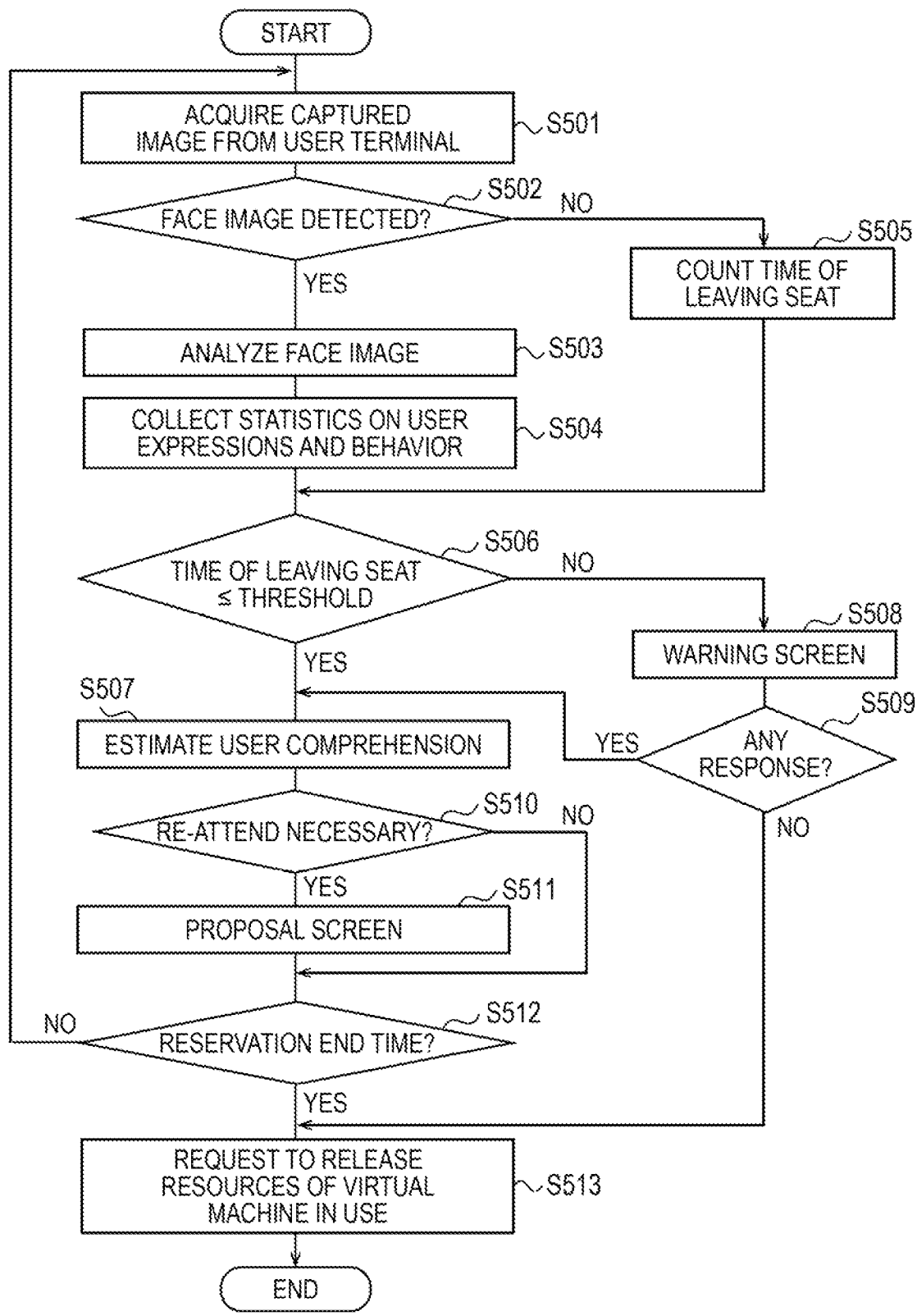
FIG. 21 is a flowchart illustrating an example of control processing based on a captured image according to the second example embodiment.

FIG. 21 is a flowchart illustrating an example of control processing based on the captured image.

First, the reservation management server 60 requests the user terminal 20 (agent 21) to perform capturing processing to acquire a captured image from the user terminal 20 (step S501).

Next, the reservation management server 60 determines whether or not a face image can be detected from the captured image (step S502). Here, when the reservation management server 60 determines that the face image can be detected (YES in step S502), the process proceeds to step S503. On the other hand, when the reservation management server 60 determines that the face image cannot be detected (NO in step S502), the reservation management server 60 counts the time of leaving the seat (step S505), and the process proceeds to step S506.

In step S503, the reservation management server 60 analyzes the face image detected from the captured image. Next, the reservation management server 60 determines the predetermined expression and behavior of the user based on the result of the image analysis of the face image, and performs statistical processing of the expression and the behavior of the user (step S504).

The predetermined facial expressions include, for example, sleepy facial expressions, puzzled facial expressions, facial expressions with little interest in the class contents, and various facial expressions that are presumed not to be intensively attended by the user. The predetermined behavior includes leaving the seat, looking aside, dozing, etc. In this step, well-known expression estimation techniques and emotion estimation techniques may be used.

In step S506, the reservation management server 60 determines whether or not the total of the time of leaving the seat is within a predetermined threshold. Here, when the reservation management server 60 determines that the time of leaving the seat is within the threshold (YES in step S506), the process proceeds to step S507. On the other hand, when the reservation management server 60 determines that the time of leaving the seat exceeds the threshold (NO in step S506), the reservation management server 60 causes the user terminal 20 to display a warning screen (step S508), and the process proceeds to step S509.

Figure 22:
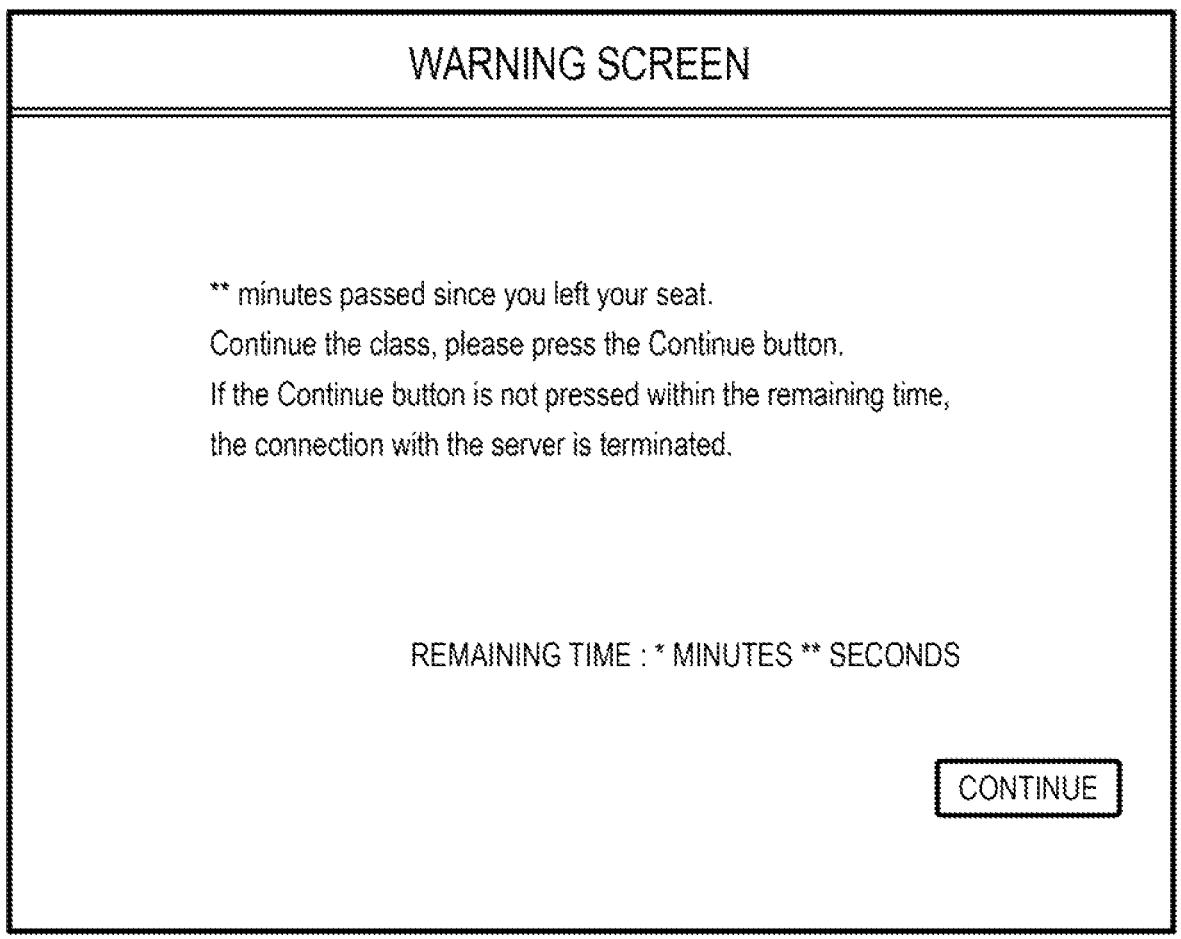
FIG. 22 is a diagram illustrating an example of a warning screen displayed on the user terminal according to the second example embodiment.

FIG. 22 is a diagram illustrating an example of a warning screen displayed on the user terminal 20. Here, it is displayed a warning message "** minutes passed since you left your seat. Continue the class, please press the Continue button. If the Continue button is not pressed within the remaining time, the connection with the server is terminated." due to the fact that the length of the time of leaving the seat about the user exceeds a predetermined threshold and a continuation button for releasing the warning state.

In step S507, the reservation management server 60 estimates the degree of understanding of the user with respect to a class being attended by using the virtual machine 31 based on the result of the statistical processing in step S504 and the length of the time of leaving the seat.

Next, the reservation management server 60 determines whether or not it is necessary for the user to re-attend the course based on the degree of understanding of the user estimated in step S507 (step S510). Here, when the reservation management server 60 determines that it is necessary for the user to re-attend the course (YES in step S510), the reservation management server 60 causes the user terminal 20 to display a proposal screen (step S511), and the process proceeds to step S512.

Figure 23:
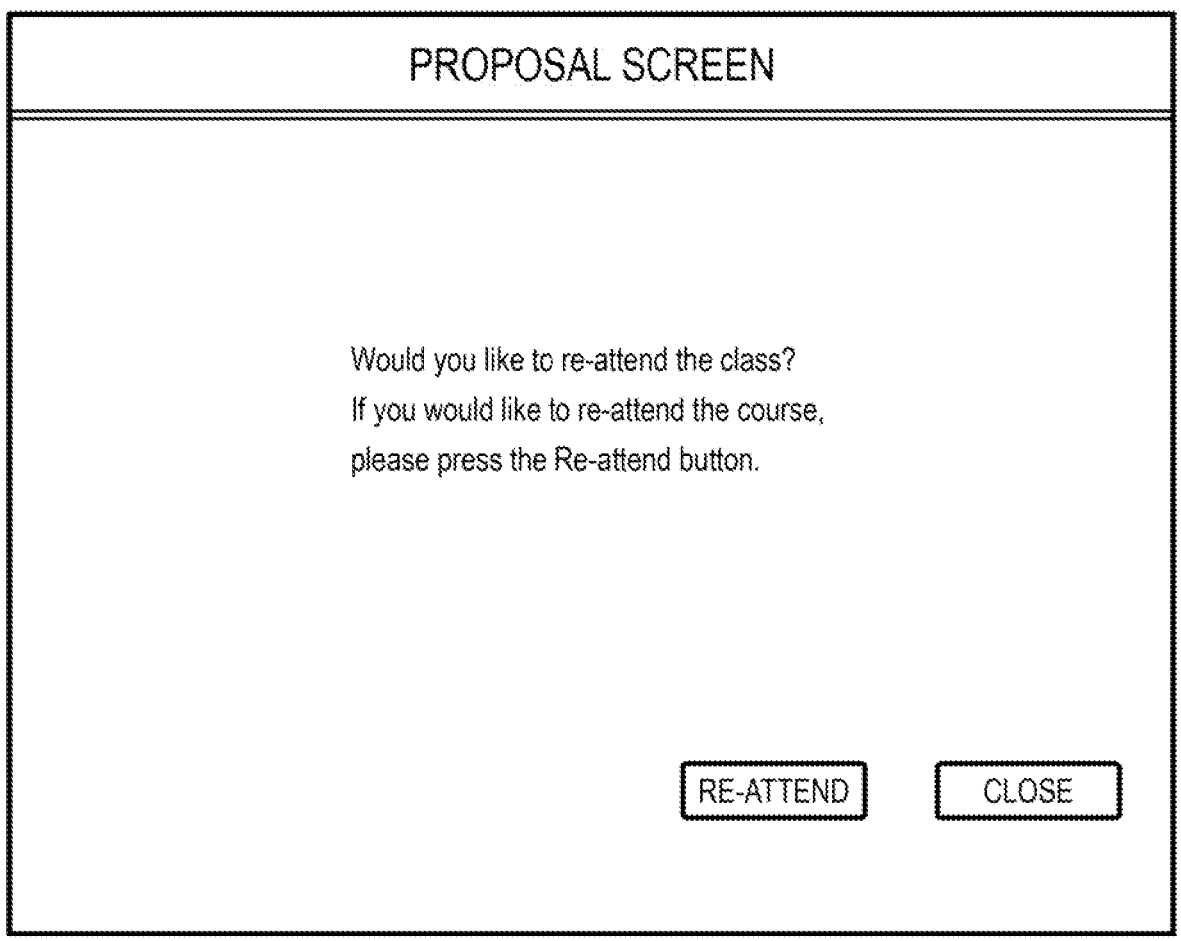
FIG. 23 is a diagram illustrating an example of a proposal screen displayed on the user terminal according to the second example embodiment.

FIG. 23 illustrates an example of the proposal screen displayed on the user terminal 20. Here, it is displayed a message "Would you like to re-attend the class? If you would like to re-attend the course, please press the Re-attend button." for urging the user to re-attend a course based on the analysis result of the face image of the user included in the captured image, and a lecture again button and a close button. When the re-attend button is pressed, the proposal screen is shifted to, for example, a reservation screen. In this case, in the reservation screen, it is preferable that the designation of the PC environment is not required and the reservation can be completed by setting only the time frame in the same PC environment.

On the other hand, when it is determined that it is not necessary for the user to re-attend the course (NO in step S510), the process proceeds to step S512. The determination in step S510 may be performed based on the expression detected by the expression estimation technique and the expression estimation technique described above. In this case, the step S507 may be omitted.

In step S512, the reservation management server 60 determines whether or not the current time has reached the reservation end time. When the reservation management server 60 determines that the current time has reached the reservation end time (YES in step S512), the process proceeds to step S513. On the other hand, when the reservation management server 60 determines that the current time has not reached the reservation end time (NO in step S512), the process returns to step S501.

In step S513, the reservation management server 60 requests the virtual infrastructure management server 40 to release the resources of the virtual machine 31 being used by the user. As a result, the virtual infrastructure management server 40 releases the resources of the requested virtual machine 31, and ends the processing of FIG. 21.

Thus, according to the present example embodiment, when a person who is different from the person who made a reservation tries to use the virtual machine 31, an error occurs due to the face authentication. Therefore, when a student attends a course from a remote place, the university can surely manage the attendance of the student.

In addition, by receiving and analyzing a captured image in the user terminal 20 in real time during the virtual machine 31 is used, it can be easily determined whether or not the student leaves from one's seat, whether or not one's attitude toward the class is appropriate, etc. For example, the reservation management server counts the time of leaving the seat. When the time of leaving the seat exceeds a predetermined threshold, controls the reservation management server 60 to release the resources used by the virtual machine 31, so that the usage efficiency of the virtual machine 31 can be improved.

The reservation management server 60 could also be designed so that if it detects that a student is dozing or otherwise not looking at the screen, it is considered that the student is leaving the seat, and the same process can be performed as in the case of leaving the seat. In this case, the reservation management server 60 may be designed to detect the line of sight of the user by analyzing the acquired face image of the user.

Furthermore, when the reservation management server 60 detects a predetermined expression or behavior by analyzing the face image of the user, it can be determined that the degree of understanding of the user with respect to a class is not sufficient. Then, the management server 10 outputs information for prompting the user to take the same class again (re-reservation) to the user terminal 20. Thus, the user can easily reserve the usage of the virtual machine 31 to be the same PC environment.

Third Example Embodiment

A third example embodiment of the present invention will be described below. Reference numerals that are common to the reference numerals denote in the drawings of the first example embodiment indicate the same objects. Description of portions common to the first example embodiment will be omitted, and portions different from the first example embodiment will be described in detail.

Figure 24:
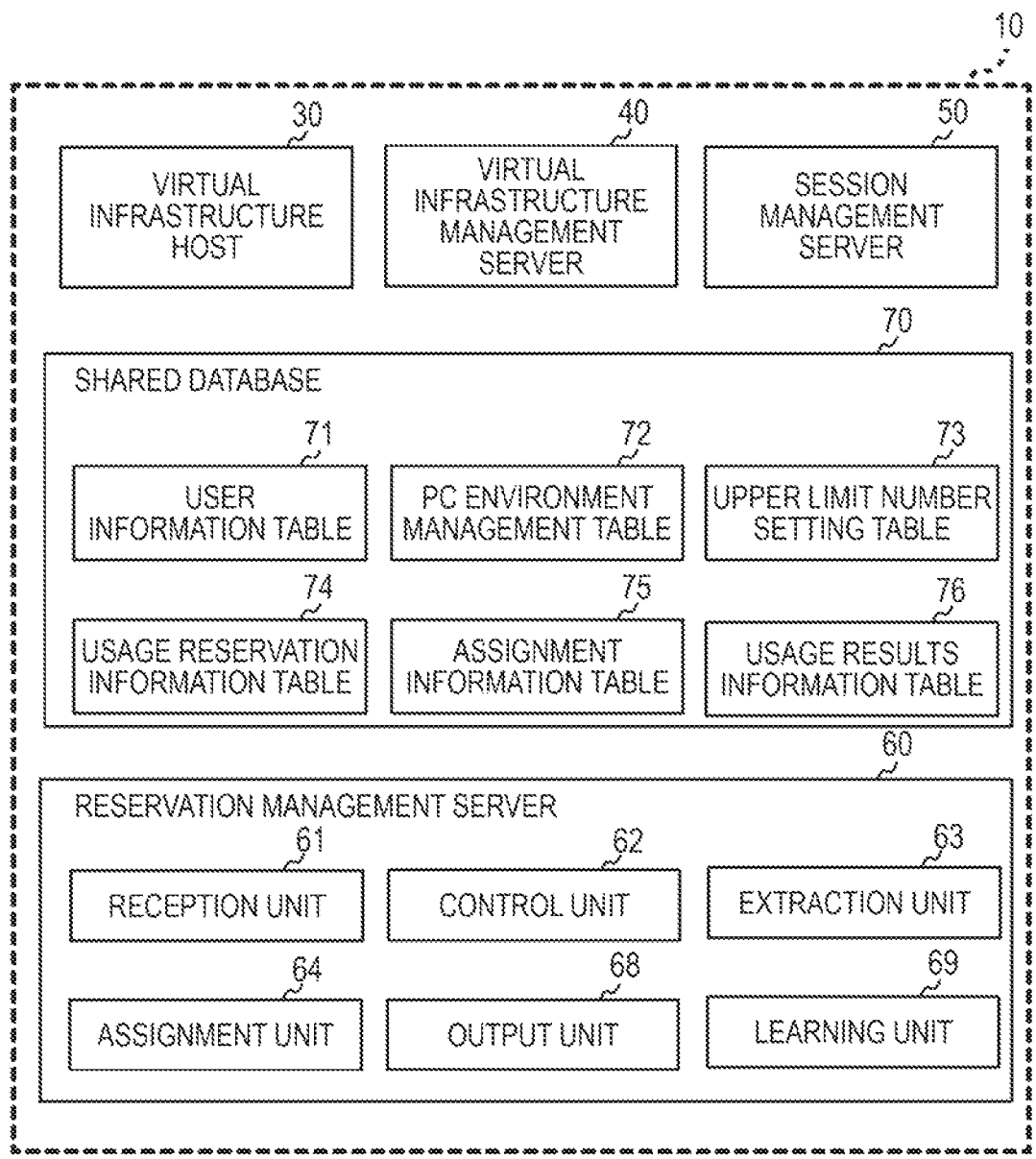
FIG. 24 is a block diagram illustrating an example of the overall configuration of a management server according to a third example embodiment.

FIG. 24 is a block diagram illustrating an example of the overall configuration of the management server 10 according to the third example embodiment. As illustrated in FIG. 24, the shared database 70 in the present example embodiment further includes a usage results information table 76. The reservation management server 60 in the present example embodiment is different from the first example embodiment in that it further includes an output unit 68 and a learning unit 69.

The learning unit 69 learns a user's past usage result in the virtual machine 31 with respect to the user's past usage reservation information (first usage reservation). The output unit 68 estimates the future usage state of the user in the virtual machine 31 to new usage reservation information (second usage reservation) of the user by using the learned learning model, and outputs information prompting the change of the second usage reservation based on the estimation result.

FIG. 25 is a diagram illustrating an example of information stored in the usage results information table 76. Here, the usage results information table 76 has a reservation ID, a user ID, a PC environment ID, a usage date, a usage start time, and usage end time as data items. The usage date, the usage start time, and the usage start time are a date, a start time, and an end time when the user actually uses the virtual machine 31.

Figure 26:
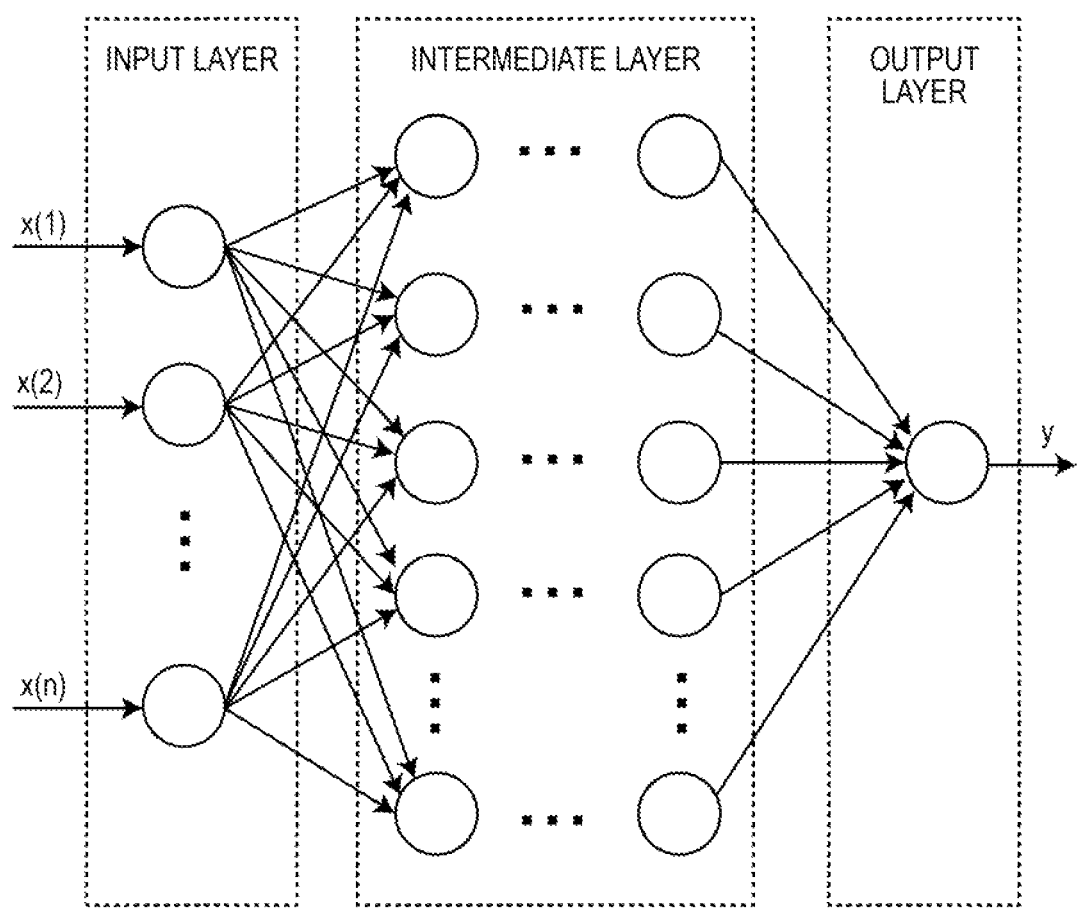
FIG. 26 is a schematic diagram illustrating an example of a neural network according to the third example embodiment.

FIG. 26 is a schematic diagram illustrating an example of a neural network used by the learning unit 69 for learning processing. The neural network illustrated in FIG. 26 includes an input layer having a plurality of nodes, intermediate layers having a plurality of nodes, and an output layer having one node.

A value representing the past usage information of the user, which is an input value, is input to nodes of the input layer. Some nodes of the intermediate layers are connected to each node of the input layer. Each element of the input value input to the nodes of the intermediate layers is used for calculation in each node of the intermediate layer. Each node of the intermediate layers calculates an operation value using, for example, an input value input from nodes of the input layer, a predetermined weighting coefficient, and a predetermined bias value. Some nodes of the intermediate layers are connected to the output layer, and output the calculated operation value to the node of the output layer. The node of the output layer receives the operation value from some nodes of the intermediate layers.

The node of the output layer outputs a value indicating usage status of the user by using the operation value inputted from some nodes of the intermediate layers, a weighting coefficient, and a bias value. The output values are compared with the teacher data. In the present example embodiment, usage results information (usage history) corresponding to usage reservation of the same user is used as the teacher data. When learning the neural network, for example, back-propagation is used.

Specifically, an output value acquired from the teacher data is compared with an output value acquired when the data is input to the input layer, and an error between the two compared output values is fed back to the intermediate layers. This operation is repeated until the error falls below a predetermined threshold. By such learning processing, when a new usage reservation is inputted to the neural network (learning model), a value indicating the future usage status of the user can be outputted.

[Control (1) Based on Learning Model]

Figure 27:
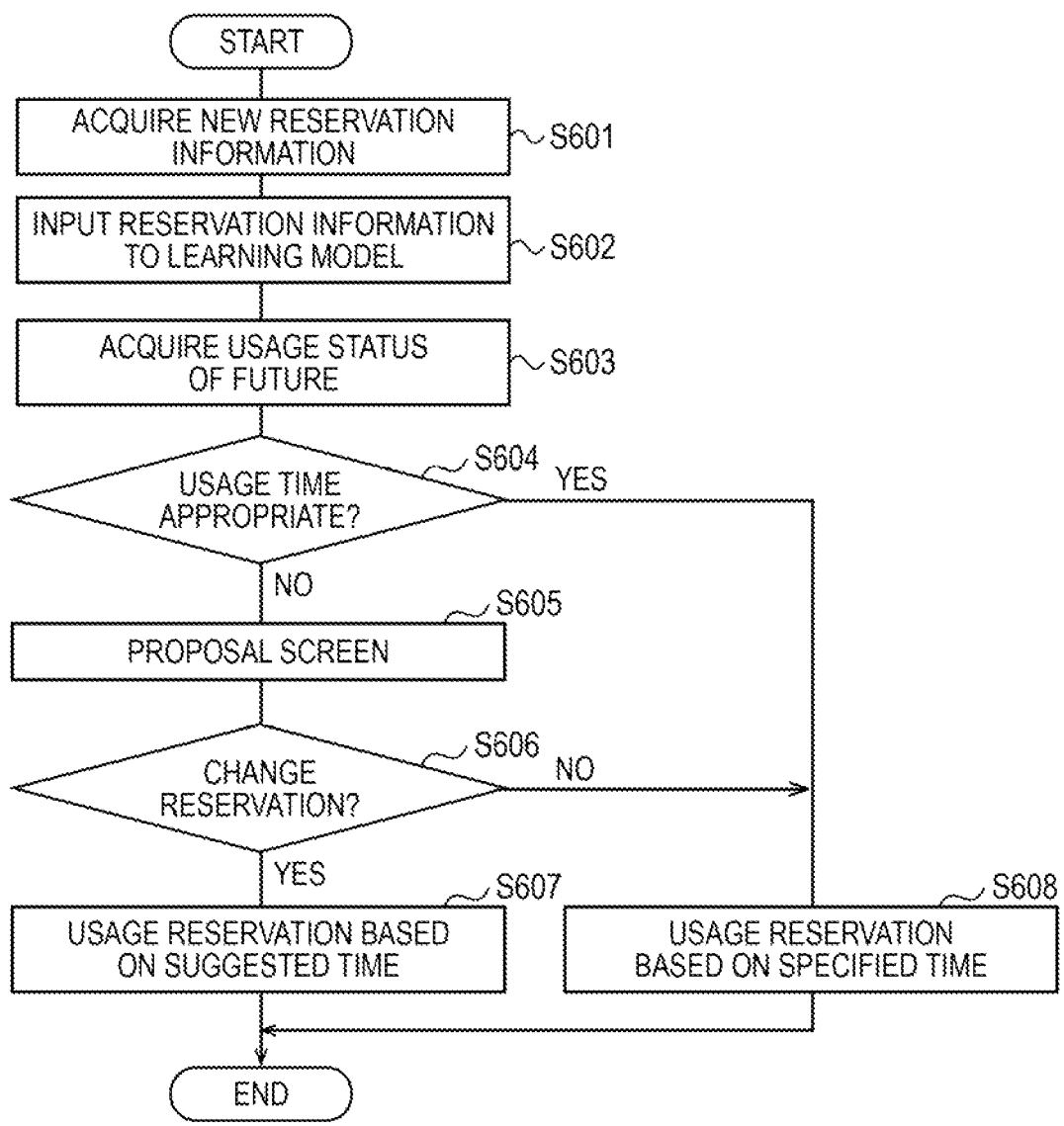
FIG. 27 is a flowchart illustrating an example of reservation processing based on a learning model according to the third example embodiment.

FIG. 27 is a flowchart illustrating an example of control processing based on the learning model.

First, when the reservation management server 60 acquires new usage reservation information received from the user terminal 20 (step S601), the reservation management server 60 inputs the usage reservation information to the learned learning model (step S602).

Next, the reservation management server 60 acquires the future usage status of the user estimated by the learning model (step S603).

Next, the reservation management server 60 compares the estimated future usage status with the usage time specified in the usage reservation, and determines whether or not the length of the usage time is appropriate (step S604). When the reservation management server 60 determines that the length of the usage time is appropriate (YES in step S604), the process proceeds to step S608. On the other hand, when the reservation management server 60 determines that the length of the usage time is not appropriate (NO in step S604), the process proceeds to step S605.

In step S605, the reservation management server 60 causes the user terminal 20 to display a proposal screen prompting the user to change the length of the usage time, and the process proceeds to step S606.

FIG. 28 is a diagram illustrating an example of a proposal screen displayed on the user terminal 20. In the upper column part of the screen, the PC environment ID, the available application, and the reservation date and time are displayed for confirmation of the reservation contents. In the lower column part of the screen, a message ("Mr./Ms. X tends to come later than the reservation time. Would you like to delay the start time by 15 minutes?") based on the future usage status of the user estimated by the learning model, a list illustrating the relationship between the past usage reservation and the usage result, and a reservation change button and a registration button for selecting whether or not to accept the proposal are displayed. The proposal screen may be a screen for allowing the user to specify the reservation start time, the reservation end time, or the length of the reservation time again. The reservation management server 60 may also propose another reservable date and time to the user.

In step S606, the reservation management server 60 determines whether or not a reservation change request from the user terminal 20 exists. When the reservation management server 60 determines that the reservation change request exists (YES in step S606), the process proceeds to step S607. On the other hand, when the reservation management server 60 determines that the reservation change request does not exist (NO in step S606), the process proceeds to step S608.

In step S607, the reservation management server 60 registers the usage reservation information automatically changed based on the suggested time in the usage reservation information table 74, and ends the process of FIG. 27. On the other hand, in step S608, the reservation management server 60 registers the usage reservation information in the usage reservation information table 74 based on the length of the user's specified time (initial reservation time), and ends the process of FIG. 27.

[Control (2) Based on Learning Model]

Figure 29:
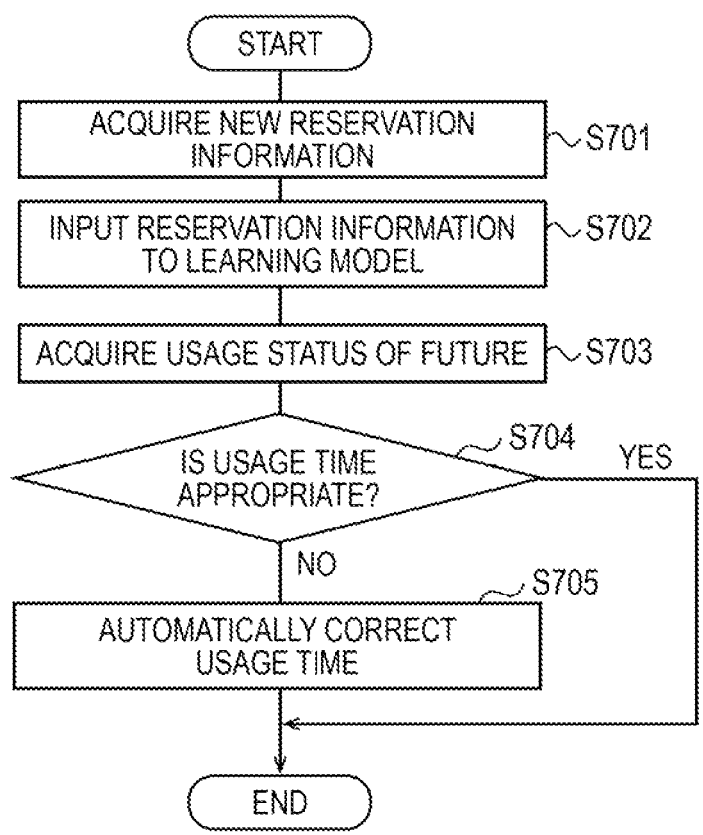
FIG. 29 is a flowchart illustrating an example of reservation processing based on the learning model according to the third example embodiment.

FIG. 29 is a flowchart illustrating an example of control processing based on the learning model.

First, when the reservation management server 60 acquires new usage reservation information received from the user terminal 20 (step S701), the reservation management server 60 inputs the usage reservation information to the learned learning model (step S702).

Next, the reservation management server 60 acquires the future usage status of the user estimated by the learning model (step S703).

Next, the reservation management server 60 compares the estimated future usage status with the usage time specified in the usage reservation, and determines whether or not the length of the usage time is appropriate (step S704). When the reservation management server 60 determines that the length of the usage time is appropriate (YES in step S704), the process of FIG. 29 ends, and the process proceeds to a usage reservation registration processing (steps S115 and S116 of FIG. 9). On the other hand, when the reservation management server 60 determines that the length of the usage time is not appropriate (NO in step S704), the process proceeds to step S705.

In step S705, the reservation management server 60 automatically corrects the usage time specified in the usage reservation based on the estimated usage status, and ends the process of FIG. 29.

In this way, according to the present example embodiment, the future usage status of the user can be estimated based on the learning model obtained by the machine learning. Thus, when a new usage reservation is input from the user, the user can confirm whether or not the length of the usage time specified by the usage reservation is appropriate.

According to the present example embodiment, the reservation management server 60 estimates a future usage state of the user, automatically corrects the usage time of the user based on the estimation result, and then performs registration processing to the usage reservation information table 74.

Fourth Example Embodiment

Figure 30:
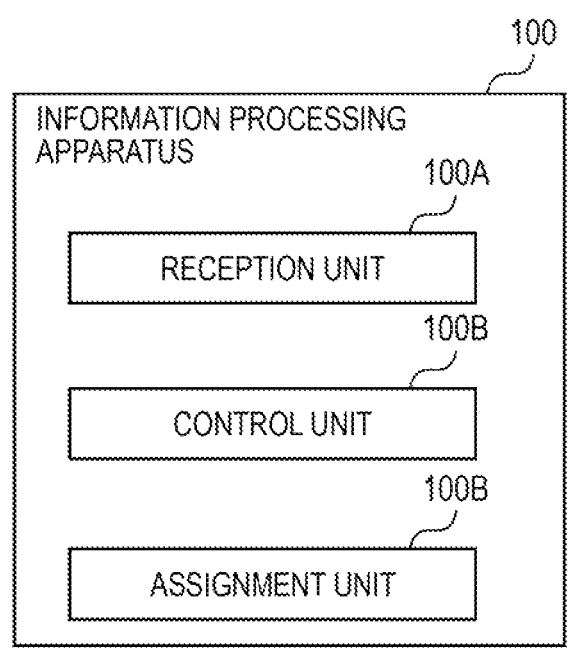
FIG. 30 is a block diagram illustrating an example of the overall configuration of an information processing apparatus in a fourth example embodiment.

FIG. 30 is a block diagram illustrating an overall configuration example of the information processing apparatus 100 in a fourth example embodiment. The information processing apparatus 100 includes a reception unit 100A, a control unit 100B, and an assignment unit 100C. The reception unit 100A receives usage reservation of a virtual machine for each usage time zone. The control unit 100B permits reception of the usage reservation until the number of the usage reservations in the usage time zone reaches a predetermined total number of the virtual machines that can operate simultaneously. The assignment unit 100C assigns the usage reservation to any one of the virtual machines with respect to the usage time zone and enables a user to use the virtual machine. According to the present example embodiment, the virtual machines can be used efficiently.

Modified Example Embodiments

While the present invention has been described above with reference to the example embodiments, the present invention is not limited to the example embodiments described above. Various modifications that may be understood by those skilled in the art can be made to the configuration and details of the present invention within the scope not departing from the spirit of the present invention. For example, it should be understood that an example embodiment in which a part of the configuration of any of the example embodiments is added to another example embodiment or an example embodiment in which a part of the configuration of any of the example embodiments is replaced with a part of the configuration of another example embodiment is also one of the example embodiments to which the present invention may be applied.

The example embodiment described above has described a configuration in which the reservation management server 60 refers to the usage reservation information recorded in the usage reservation information table 74 and requests the virtual infrastructure management server 40 to create a virtual desktop environment and release resources. However, the reservation management server 60 may determine whether or not the user is actually using the virtual desktop environment in addition to the usage reservation information and accept the usage reservation based on the determination result.

For example, when the user made a reservation for use from thirteen o'clock to fifteen o'clock, but the user oneself declares the end of usage of the virtual machine 31 at fourteen o'clock on the screen, the usage time zone (usage frame) between fourteen o'clock and fifteen becomes available. In such a case, the reservation management server may automatically update the remaining number of corresponding slots in the upper limit number setting table based on the actual utilization state so that the reservation can be accepted in the free utilization time zone following the completion of the utilization of the virtual machine 31. Thus, the usage efficiency of the limited number of virtual machines 31 can be further improved.

In addition, although the example embodiment described above has described a configuration in which the user designates and reserves a type (PC environment ID) of a virtual machine capable of using a desired application 311, information specified at the time of reservation is not limited thereto. For example, the reservation management server 60 may be configured to generate a virtual machine 31 capable of executing the application 311 selected by the user when the image of the application 311 desired to be used by the user is selected on the screen. That is, it is also possible to reserve the use for each application.

Furthermore, it is also conceivable that the user selects a usable usage time zone without considering the contents (PC environment) of the application 311 installed in the virtual machine 31 to reserve the usage of the virtual machine 31. For example, when the number of licenses of the application 311 is sufficient, the usage reservation of the virtual machine 31 can be performed for each usage time zone within the upper limit number set based on the server hardware resources 33.

Further, the scope of the example embodiments also includes a processing method that stores, in a storage medium, a program that causes the configuration of each of the example embodiments to operate so as to implement the function of each of the example embodiments described above, reads the program stored in the storage medium as a code, and executes the program in a computer. That is, the scope of each of the example embodiments also includes a computer readable storage medium. Further, each of the example embodiments includes not only the storage medium in which the program described above is stored but also the program itself.

As the storage medium, for example, a floppy (registered trademark) disk, a hard disk, an optical disk, a magneto-optical disk, a CD-ROM, a magnetic tape, a nonvolatile memory card, or the like can be used. Further, the scope of each of the example embodiments includes an example that operates on OS to perform a process in cooperation with another software or a function of an add-in board without being limited to an example that performs a process by an individual program stored in the storage medium.

The whole or part of the example embodiments disclosed above can be described as, but not limited to, the following supplementary notes.

(Supplementary Note 1)

An information processing apparatus comprising:
   a reception unit that receives usage reservation of a virtual machine for each usage time zone;
   a control unit that permits reception of the usage reservation until the number of the usage reservations in the usage time zone reaches a predetermined total number of the virtual machines that can operate simultaneously; and
   an assignment unit that assigns the usage reservation to any one of the virtual machines with respect to the usage time zone and enables a user to use the virtual machine.

(Supplementary Note 2)

The information processing apparatus according to supplementary note 1,
   wherein the assignment unit assigns the usage reservation to the virtual machine available at the start time of the usage time zone.

(Supplementary Note 3)

The information processing apparatus according to supplementary note 2,
   wherein the assignment unit assigns the usage reservation whose time from the current time to the start time is within a predetermined time to the virtual machine.

(Supplementary Note 4)

The information processing apparatus according to supplementary note 1 or 2,
   wherein the assignment unit assigns the usage reservation based on a predefined priority for the plurality of virtual machines.

(Supplementary Note 5)

The information processing apparatus according to any one of supplementary notes 1 to 4, further comprising:
   an image acquisition unit that acquires a captured image captured by a user terminal used for the virtual machine; and
   a matching unit that matches a face image of the user extracted from the captured image with a registered face image of the user,
   wherein the assignment unit stops the usage of the virtual machine when the face image and the registered face image do not match each other.

(Supplementary Note 6)

The information processing apparatus according to any one of supplementary notes 1 to 4, further comprising:
an image acquisition unit that acquires a captured image captured by a user terminal used for the virtual machine;
a detection unit that detects a predetermined expression or behavior of the user from the captured image; and
an output unit that outputs to the user terminal information prompting the user to input the usage reservation based on the detection result.

(Supplementary Note 7)

The information processing apparatus according to any one of supplementary notes 1 to 4, further comprising:
an output unit that, by using a learning model for learning a past usage result of the virtual machine of the user with respect to a first usage reservation of the user, estimates a future usage status of the virtual machine of the user with respect to a new second usage reservation of the user, and outputs information for prompting the change of the second usage reservation based on the estimation result.

(Supplementary Note 8)

The information processing apparatus according to any one of supplementary notes 1 to 4,
wherein the assignment unit that, by using a learning model for learning a past usage result of the virtual machine of the user with respect to a first usage reservation of the user, estimates a future usage status of the virtual machine of the user with respect to a new second usage reservation of the user, and corrects the usage time zone specified in the second usage reservation based on the estimation result.

(Supplementary Note 9)

An information processing method comprising:
receiving a usage reservation of a virtual machine for each usage time zone;
permitting reception of the usage reservation until the number of the usage reservations in the usage time zone reaches a predetermined total number of the virtual machines that can be executed simultaneously; and
assigning the usage reservation to any one of the virtual machines with respect to the usage time zone and enables a user to use the virtual machine.

(Supplementary Note 10)

A storage medium storing a program that causes a computer to perform:
receiving a usage reservation of a virtual machine for each usage time zone;
permitting reception of the usage reservation until the number of the usage reservations in the usage time zone reaches a predetermined total number of the virtual machines that can be executed simultaneously; and
assigning the usage reservation to any one of the virtual machines with respect to the usage time zone and enables a user to use the virtual machine.

This application claims priority based on Japanese Application 2019-118356, filed Jun. 26, 2019, and incorporates all of its disclosures.

REFERENCE SIGNS LIST

NW network
1 information processing system
10 management server
20 user terminal
21 agent
30 virtual infrastructure host
31 virtual machine
311 application
312 guest OS
32 hypervisor
33 server hardware resources
331 processor (CPU, GPU)
332 memory
333 NIC
40 virtual infrastructure management server
50 session management server
60 reservation management server
70 shared database
71 user information table
72 PC environment management table
73 upper limit number setting table
74 reservation information table
75 assignment information table
76 usage reservation information table
100 information processing apparatus

What is claimed is:

1. An information processing apparatus comprising:
a processor; and
a memory storing executable instructions that, when executed by the processor, causes the processor to perform as:
a reception unit that receives usage reservation of a virtual machine for each usage time zone;
a control unit that permits reception of the usage reservation until a number of the usage reservations in the usage time zone reaches a predetermined total number of the virtual machines that can operate simultaneously; and
an assignment unit that assigns the usage reservation to any one of the virtual machines with respect to the usage time zone and enables a user to use the virtual machine.

2. The information processing apparatus according to claim 1,
wherein the assignment unit assigns the usage reservation to the virtual machine available at start time of the usage time zone.

3. The information processing apparatus according to claim 2,
wherein the assignment unit assigns the usage reservation whose time from current time to the start time is within a predetermined time to the virtual machine.

4. The information processing apparatus according to claim 1,
wherein the assignment unit assigns the usage reservation based on a predefined priority for the plurality of virtual machines.

5. The information processing apparatus according to claim 1, wherein said instructions, when executed by the processor, further cause the processor to perform as:
an image acquisition unit that acquires a captured image captured by a user terminal used for the virtual machine; and
a matching unit that matches a face image of the user extracted from the captured image with a registered face image of the user,
wherein the assignment unit stops using the virtual machine when the face image and the registered face image do not match each other.

6. The information processing apparatus according to claim 1, wherein said instructions, when executed by the processor, cause the processor to perform as:
- an image acquisition unit that acquires a captured image captured by a user terminal used for the virtual machine;
- a detection unit that detects a predetermined expression or behavior of the user from the captured image; and
- an output unit that outputs to the user terminal information prompting the user to input the usage reservation based on the detection result.

7. The information processing apparatus according to claim 1, wherein said instructions, when executed by the processor, cause the processor to perform as:
- an output unit that, by using a learning model for learning a past usage result of the virtual machine of the user with respect to a first usage reservation of the user, estimates a future usage status of the virtual machine of the user with respect to a new second usage reservation of the user, and outputs information for prompting change of the second usage reservation based on a result of estimating the future usage status.

8. The information processing apparatus according to claim 1,
- wherein the assignment unit that, by using a learning model for learning a past usage result of the virtual machine of the user with respect to a first usage reservation of the user, estimates a future usage status of the virtual machine of the user with respect to a new second usage reservation of the user, and corrects the usage time zone specified in the second usage reservation based on a result of estimating the future usage status.

9. An information processing method comprising:
receiving a usage reservation of a virtual machine for each usage time zone;
permitting reception of the usage reservation until a number of the usage reservations in the usage time zone reaches a predetermined total number of the virtual machines that can be executed simultaneously; and
assigning the usage reservation to any one of the virtual machines with respect to the usage time zone and enables a user to use the virtual machine.

10. A non-transitory storage medium storing a program that causes a computer to perform:
receiving a usage reservation of a virtual machine for each usage time zone;
permitting reception of the usage reservation until a number of the usage reservations in the usage time zone reaches a predetermined total number of the virtual machines that can be executed simultaneously; and
assigning the usage reservation to any one of the virtual machines with respect to the usage time zone and enables a user to use the virtual machine.

* * * * *